(12) United States Patent
Bagdal

(10) Patent No.: US 12,311,423 B2
(45) Date of Patent: May 27, 2025

(54) SYSTEM AND METHOD FOR IMPROVING ROLL ROUNDNESS

(71) Applicant: Karl Bagdal, Middletown, OH (US)

(72) Inventor: Karl Bagdal, Middletown, OH (US)

(*) Notice: Subject to any disclaimer, the term of this patent is extended or adjusted under 35 U.S.C. 154(b) by 0 days.

(21) Appl. No.: 18/049,268

(22) Filed: Oct. 24, 2022

(65) Prior Publication Data
US 2023/0131792 A1    Apr. 27, 2023

Related U.S. Application Data

(60) Provisional application No. 63/271,468, filed on Oct. 25, 2021.

(51) Int. Cl.
| | | |
|---|---|---|
| *B24B 5/37* | (2006.01) | |
| *B21B 38/04* | (2006.01) | |
| *B23B 25/06* | (2006.01) | |
| *B24B 49/02* | (2006.01) | |
| *B24B 55/06* | (2006.01) | |

(52) U.S. Cl.
CPC ............. *B21B 38/04* (2013.01); *B23B 25/06* (2013.01); *B24B 5/37* (2013.01); *B24B 49/02* (2013.01); *B24B 55/06* (2013.01)

(58) Field of Classification Search
CPC ........... B24B 49/02; B24B 5/37; B24B 38/04; B23B 25/06; B23B 25/065
USPC .................................................. 451/5, 9–11
See application file for complete search history.

(56) References Cited

U.S. PATENT DOCUMENTS

| | | | | |
|---|---|---|---|---|
| 3,486,275 | A | * | 12/1969 | Chitayat ................... H02P 5/50 |
| | | | | 451/6 |
| 4,524,546 | A | * | 6/1985 | Hoover ................... G01B 7/282 |
| | | | | 451/142 |
| 4,926,337 | A | * | 5/1990 | Gile ........................ B23Q 3/152 |
| | | | | 33/642 |
| 5,007,152 | A | | 4/1991 | Tomizawa et al. |
| 5,117,081 | A | | 5/1992 | Bagdal |
| 5,419,056 | A | | 5/1995 | Breitenstein |
| 5,447,463 | A | * | 9/1995 | Schmitz .................... B24B 5/22 |
| | | | | 451/10 |
| 5,558,557 | A | * | 9/1996 | Dashevsky ............ B23Q 15/24 |
| | | | | 451/10 |
| 5,694,339 | A | | 12/1997 | Ishitoya et al. |
| 5,800,247 | A | | 9/1998 | Harms |
| 6,257,964 | B1 | | 7/2001 | Helgren |
| 7,146,850 | B2 | | 12/2006 | McCrea et al. |
| 8,161,620 | B2 | | 4/2012 | Ficker et al. |
| 8,403,725 | B2 | * | 3/2013 | Honegger .......... B23Q 17/2419 |
| | | | | 451/6 |

(Continued)

*Primary Examiner* — Brian D Keller
*Assistant Examiner* — Marcel T Dion
(74) *Attorney, Agent, or Firm* — Jenei LLC

(57) ABSTRACT

An apparatus, computer program product, and method provide for increased economy in maintaining working and backup rollers that are used to producing sheet metal of uniform thickness. Left and right necks of the roller are supported and rotated. A radial measurement is made of left and right necks to calculate a center of rotation of each neck. Radial positions of reference spheres centered at each end that define a gage reference line (GRL) are measured. Material is removed from the necks to not only increase roundness but also to move the center of rotation of each neck toward the GRL, enabling grinding/machining of a body portion of the roller to restore roundness with reduced waste of material.

5 Claims, 24 Drawing Sheets

(56) References Cited

U.S. PATENT DOCUMENTS

| | | |
|---|---|---|
| 2006/0137482 A1 | 6/2006 | Stibl et al. |
| 2009/0049893 A1* | 2/2009 | Hidaka et al. |
| 2019/0078868 A1* | 3/2019 | Grossmann ............. B23B 25/06 |
| 2020/0223029 A1* | 7/2020 | Yoshida .................. B24B 51/00 |

* cited by examiner

SYSTEM AND METHOD FOR IMPROVING ROLL ROUNDNESS

CROSS-REFERENCE TO RELATED APPLICATIONS

This application claims the benefit of priority under 35 U.S.C. § 119(e) to U.S. Patent Application Provisional Application Ser. No. 63/271,468, entitled "MEASURING ROUNDNESS WITH POLAR COORDINATES OF BACK-UP AND WORK ROLLS UTILIZED IN STEEL ROLLING PROCESSES," filed Oct. 25, 2021, the contents of which are hereby incorporated by reference in their entirety for any purpose.

BACKGROUND

1. Technical Field

The present disclosure relates to an apparatus and process for measuring roundness of back-up and work rolls such as utilized in steel rolling processes.

2. Description of the Related Art

In steel rolling, metal forming, and similar processes, gage variations which are induced in flat rolled sheet products by eccentricity of the back-up and/or work rolls, is a widespread problem which is growing in criticality as a result of increasing demand for improved control of gage variation and strip shape. Eccentricity is defined as the sum of out-of-roundness and concentricity errors. The gage thickness variation of the final formed sheet is directly dependent upon the radial variation of the rolls and the roll's concentricity errors. Minimizing thickness variation in the sheet products is critical to enabling the most efficient use of materials and energy to produce acceptable products. Accurate measurement enables reduction in eccentricities in the back-up and work rolls.

FIG. 1 depicts a front view of a generally known four-high steel rolling machine 100 having top and bottom work rolls 102a-102b and top and bottom backup rolls 104a-104b that press a steel product 106 from an upstream thicker product. For clarity, chocks are omitted that rotatably receive each cylindrical neck 108 of the work rolls 102a-102b and backup rolls 104a-104b. The steel product 106 passes between the top work roll 102a and the bottom work roll 102b. The top backup roll 104a is above and in rolling contact with the top work roll 102a. The bottom backup roller 104b is below and in rolling contact with the bottom work roll 102b. Each backup roll 104a-104b includes a conical neck 110 that transitions to the diameter of each end of the backup roll 104a-104b from a wider diameter central cylinder 112 of about 58 inches to the respective cylindrical neck 108. Work to provide vertical compression to the steel product 106 of up 3000 tons, chocks that are actuated respectively by hydraulic cylinders that press downward on the two conical necks 110 of the top backup roll 104a and two load cells respectively react to the two conical necks 110 of the bottom backup roll 104b. The work rolls 102a-102b and backup rolls 104a-104b experience wear and distortions during use and require periodic regrinding to restore roundness.

Previously, an apparatus and method was provided for measuring and machining the roundness and concentricity of an outer surface of a roll having oppositely disposed ends spaced along a longitudinal axis. Specifically, U.S. Pat. No. 5,117,081 entitled "Roll roundness measuring and machining apparatus and method" issued 26 May 1992 is hereby incorporated by reference in its entirety. The disclosed apparatus includes a plurality of spaced roll supports for rotatably supporting the outer surface, and one or more drive wheels to rotate the roll about its longitudinal axis. An axial strut is provided for limiting the axial movement of the roll during rotation, and a pair of locators are individually mounted adjacent each of the ends of the roll and establish a reference line along the roll. A plurality of displacement monitoring devices using lasers simultaneously measure variations in the contour of the outer surface and movement of the reference line as the roll is rotated. The apparatus is further designed to determine the true axis of rotation of the roll, whereby a profile of the roll can be obtained by comparing roundness measurements taken at any point along the longitudinal axis to the true axis of rotation. A preferred embodiment includes an electrical discharge machining device which can utilize roundness and concentricity measurements to optimize the machining of the outer surface. Although the disclosed apparatus and method provided improvements in restoring roundness to a roll, additional roundness is desired to achieve economical savings.

SUMMARY OF THE INVENTION

In one aspect, the present disclosure provides a measure-then-machine (MTM) system that includes a machine frame that supports a roll measuring subsystem and a roll machining subsystem. The machine frame has: (i) a first pair of powered support rolls that receives a first roll neck; and (ii) a second pair of powered support rolls that receives a second roll neck of a roll used as one of a backup roll and a work roll for sheet metal forming, a longitudinal axis of the roll generally aligned with a longitudinal X-axis of the machine frame. The roll measuring subsystem includes a measurement linear slide to a first side of the roll. The roll measuring subsystem includes one or more radial probes received for respective radial movement in parallel to a Y-axis of the machine frame that is orthogonal to the X-axis. The roll measuring subsystem includes one or more laser interferometer systems is aligned to measure distance along the Y-axis for a corresponding one of the one or more radial probes. The one or more radial probes are positioned to extend respectively to: (i) a first reference sphere coupled to and generally centered on a first longitudinal end of the roll on a gage reference line (GRL); (ii) the first roll neck; (iii) the roll body; (iv) the second roll neck; and the second reference sphere coupled to and generally centered on a second longitudinal end of the roll on the GRL. The roll measuring subsystem includes one or more first electrical motors coupled to move along the Y-axis respectively a corresponding one of the one or more radial probes. The roll measuring subsystem includes a straight-edge that is positionable at an origin line that is parallel to the X-axis and is in front of the one or more radial probes in a retracted position to obtain a null measurement. The roll measuring subsystem includes a rotary encoder that senses a rotation position of the roll. The roll machining subsystem includes a machining linear slide to a second side of the roll, the second side being opposite to the first side. The roll machining subsystem includes a metal removing device received for horizontal movement by the machining linear slide. The roll machining subsystem includes a second electrical motor coupled to move the metal removing device on the machining linear slide. A controller of the MTM system is communicatively coupled to the roll measuring subsystem and the roll machining subsystem. The controller nulls the one or more radial probes against the straight-edge that is positioned at the origin line. The controller measures a respective origin distance for each of the one or more radial probes using a corresponding laser interferometer system. The controller monitors the rotary encoder for a rotation position of the roll. The controller moves the one or more radial probes into a null position against a respective surface of the roll using a corresponding one of the first electrical motors. The controller rotates the roll using the powered support rolls. The controller measures a respective radial distance at a particular rotation angle of the roll for each one of the one or more radial probes using the corresponding laser interferometer system. The controller determines an amount of machining required for each portion of the roll based on the respective radial distance from the GRL. The controller machines the roll using the metal removing device by removing metal at rate related to the respective radial distance from the GRL for each particular portion of the roll.

In another aspect, the present disclosure provides a method includes determining a rotation position of a roll received on a machine of an MTM system. The machine frame has: (i) a first pair of powered support rolls that receives a first roll neck; and (ii) a second pair of powered support rolls that receives a second roll neck of a roll used as one of a backup roll and a work roll for sheet metal forming, a longitudinal axis of the roll generally aligned with a longitudinal X-axis of the machine frame. The method includes nulling one or more radial probes against a straight-edge that is positioned at an origin line. The one or more radial probes are received for respective radial movement in parallel to a Y-axis of the machine frame that is orthogonal to the X-axis. The method includes measuring a respective origin distance for each of the one or more radial probes using a corresponding laser interferometer system. The method includes monitoring a rotary encoder for a rotation position of the roll. The method includes moving the one or more radial probes into a null position against a respective surface of the roll using a corresponding first electrical motor. The method includes rotating the roll using the powered support rolls. The method includes measuring a respective radial distance at a particular rotation angle of the roll for each one of the one or more radial probes using the corresponding laser interferometer system. The method includes determining an amount of machining required for each portion of the roll based on the respective radial distance from the GRL. The method includes machining the roll using the metal removing device by removing metal at rate related to the respective radial distance from the GRL for each particular portion of the roll.

In an additional aspect, a computer program product includes program code on a computer readable storage device. When executed by a processor associated with an electronic device, the program code enables the electronic device to provide functionality of determining a rotation position of a roll received on a machine of a MTM system. The machine frame has: (i) a first pair of powered support rolls that receives a first roll neck; and (ii) a second pair of powered support rolls that receives a second roll neck of a roll used as one of a backup roll and a work roll for sheet metal forming, a longitudinal axis of the roll generally aligned with a longitudinal X-axis of the machine frame. The functionality includes nulling one or more radial probes against a straight-edge that is positioned at an origin line, the one or more radial probes received for respective radial movement in parallel to a Y-axis of the machine frame that is orthogonal to the X-axis. The functionality includes measuring a respective origin distance for each of the one or more radial probes using a corresponding laser interferometer system. The functionality includes monitoring a rotary encoder for a rotation position of the roll. The functionality includes moving the one or more radial probes into a null position against a respective surface of the roll using a corresponding first electrical motor. The functionality includes rotating the roll using the powered support rolls. The functionality includes measuring a respective radial distance at a particular rotation angle of the roll for each one of the one or more radial probes using the corresponding laser interferometer system. The functionality includes determining an amount of machining required for each portion of the roll based on the respective radial distance from the GRL. The functionality includes machining the roll using the metal removing device by removing metal at rate related to the respective radial distance from the GRL for each particular portion of the roll.

These and other features are explained more fully in the embodiments illustrated below. It should be understood that in general the features of one embodiment also may be used in combination with features of another embodiment and that the embodiments are not intended to limit the scope of the invention.

BRIEF DESCRIPTION OF THE DRAWINGS

The various exemplary embodiments of the present invention, which will become more apparent as the description proceeds, are described in the following detailed description in conjunction with the accompanying drawings, in which:

FIG. 13 depicts a plan view of a work roll showing the use of a straightedge, which represents the X axis or y=0 position, to zero out all radial probes in order to begin the measurement of absolute Y values, according to one or more embodiments.

DETAILED DESCRIPTION

Figure 1:
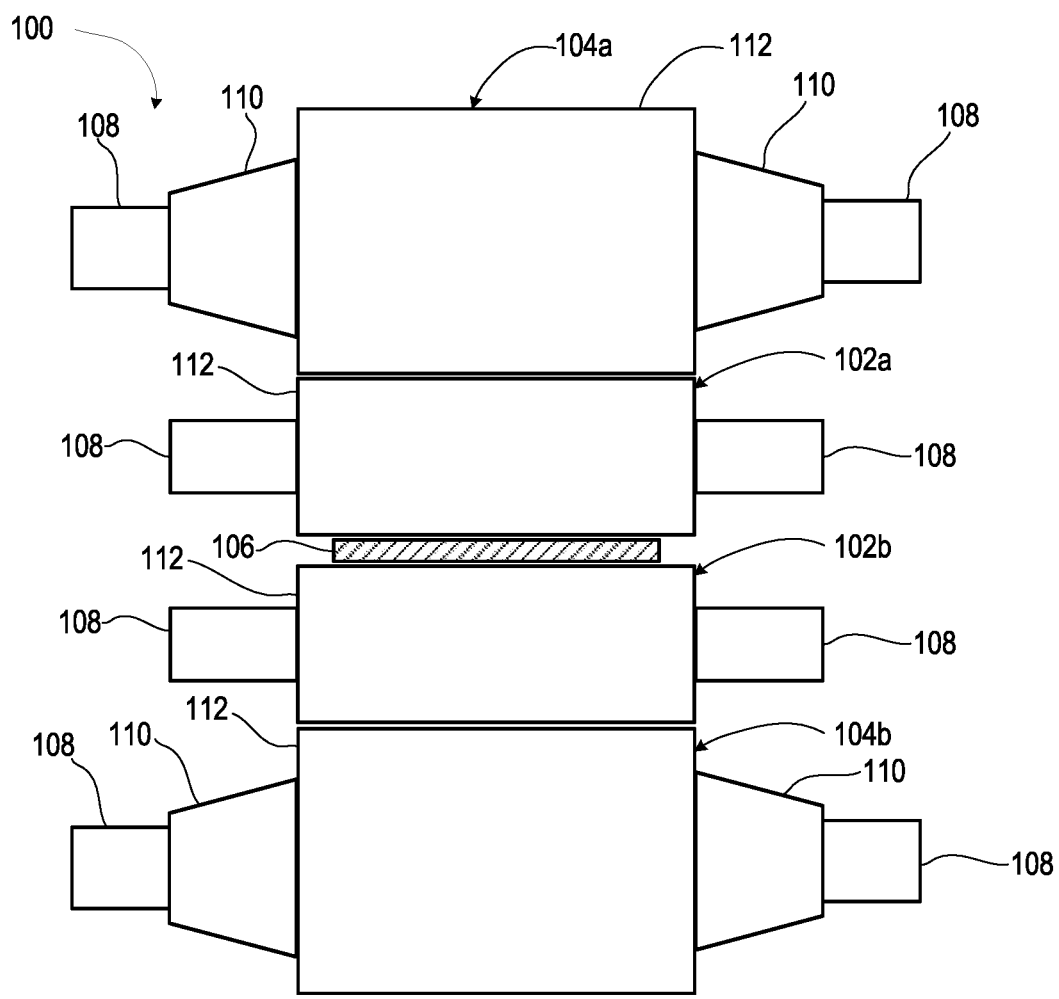
FIG. 1 depicts a front view of a generally known four-high steel rolling machine having top and bottom work rolls and top and bottom backup rolls that press a steel product from an upstream thicker product.
Figure 2A:
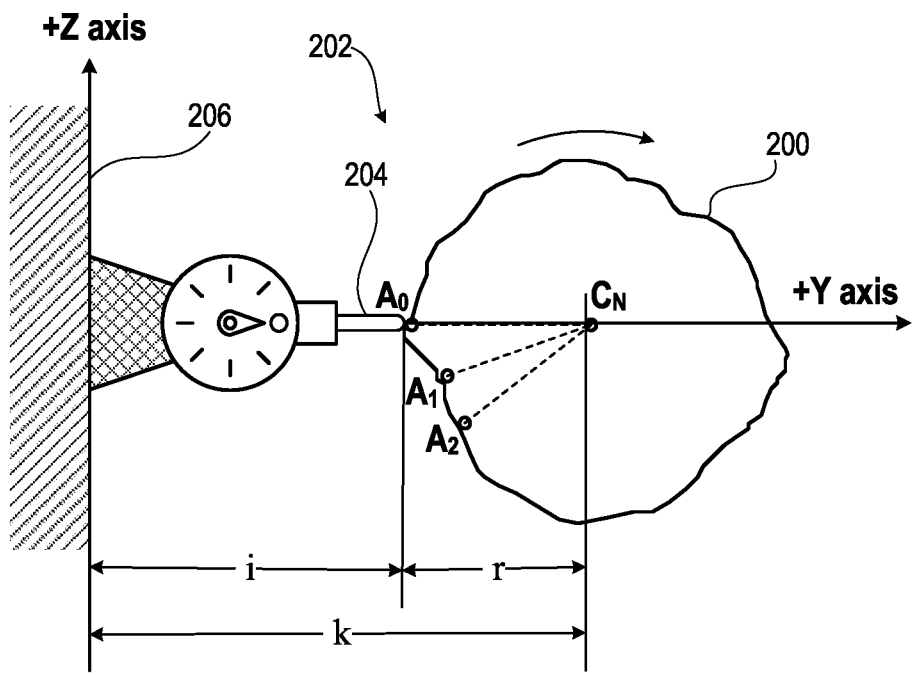
FIG. 2A illustrates an end view of a back-up or work roll positioned in a roundness measurement system, according to one or more embodiments.

FIG. 2A depicts an end view of a worn steel backup or work roll 200 positioned on a roundness measurement system 202 that measures variation of line segment $\overline{AC}$ using polar coordinates. Measurement tip 204 contacts horizontal dimensional points $A_0, A_1, A_2, \ldots A_Z$ of roll 200 responsively at horizontal coordinates $y_0, y_1, y_2, \ldots y_Z$ at a varying distance "i" from reference wall 206 along horizontal y axis. Center "c" of roll is at horizontal coordinate "$y_c$". Radius "r" can be found from:

$$r = y_C - y_A$$

$$i = Y_A$$

$$m = y_C$$

$$\Delta r = r_{final} - r_{initial}$$

$$r = -i + m \text{(absolute values)} \quad \text{Eqn. (1)}$$

After object has rotated:

$$(r + \Delta r) = -(i + \Delta i) + (m + \Delta m) \quad \text{Eqn. (2)}$$

Substituting Eqn. (1) into Eqn. (2) yields:

$$(r + \Delta r) = -(i + \Delta i) + (r + i + \Delta m) \quad \text{Eqn. (3)}$$

Eqn. (3) reduces to $$\Delta r = -\Delta i + \Delta m \text{(relative values)} \quad \text{Eqn. (4)}$$

There are two ways to properly record radial variation for roundness measuring, noting that $\Delta m$ in Eqn. (4) is noise. The first approach is to keep $\Delta m$ as close to zero as possible (i.e., $\Delta m = 0$ means that the object rotates on a perfectly stationary axis of rotation). This first method is used by metrology lab roundness measuring hardware, such as rank Taylor Hobson's precision air bearing turntables that have radial run-out errors of 5 millionths of an inch or less.

According to aspects of the present disclosure, the second approach is to allow $\Delta m$ to vary but measure $\Delta m$ along with $\Delta i$ (i.e., measure the motion of center point c).

Background on the Industry Problem to be Solved: In a runout measurement, there are two causes for the dial indicators needle to move: (i) The variation of the objects radii; and (ii) The movement of Point C–whole body movement. For a correct measurement of roundness error, Point C must not move. To prove this, suppose a perfectly round part is being tested for roundness and Point C is moving erratically in the X&Y directional. One would conclude that the part is out of round or eccentric. So, runout measuring is not a test for roundness or concentricity.

A Run-Out measurement, as shown here, can become a roundness measurement or a radial variation measurement. When a single point near the center (Point CN) is measured for its horizontal position simultaneously with the horizontal location of various outer surface points (A0, A1, A2, etc.).

FIG. 2A depicts the physical system used by all machinist to measure runout. And it is a relative measurement process. It is a relative measurement in that the displacement measuring transducer (in this case, a dial indicator) is set to zero before rotation of the measured object begins. At this point, the absolute radius (distance from CN to AC, is not known.

Rotation of the object commences as radius A1C is compared to A0C (which is zero) for a relative measurement. This measuring process assumes that Point C never moves from its original starting position, especially in the horizontal direction, as this motion will yield extremely faulty data. Most people who practice this measuring process are assuming that point C is stationary. Of course, Point C does move and so it has to be measured. But point Cs motion cannot be measured directly as it is unreachably buried within the mass of the object. However, point C can be measured for its movements indirectly by a gage reference line (GRL) line that passes through point CN and any other points of interest along the length of the roll. The GRL line is defined as the straight line that joins the centers of the two reference spheres that are mounted at each end of the roll. This establishes a reference line (very close to the roles axis, but it is not coincident with the rolls Axis) from which to indirectly monitor the movement of Point C during the radius measuring process.

Figure 2B:
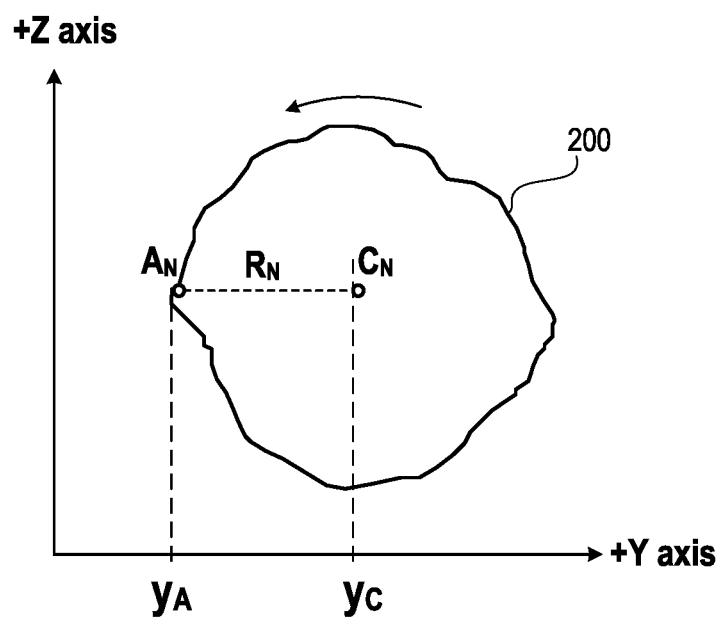
FIG. 2B illustrates another end view of a back-up or work roll positioned in a roundness measurement system, according to one or more embodiments.

FIG. 2B illustrates another end view of a back-up or work roll 200 positioned in a roundness measurement system 202. To measure any radius of a round object requires measuring the y-z coordinates at each end of a radial line. That is, points An and $C_N$. Previously, people measured what surface point $A_N$ was doing and never looked at measuring the movement of the other end of the radial line, which is Point $C_N$. This is the very foundation and fundamental principle that governs all of this present invention.

$$R_N = \sqrt{(C_Y - A_Y)^2 (C_Z - A_Z)^2},$$ where $C_Y - A_Y$ is extremely small and practically zero, so equation above becomes:

$$R_N = |C_y - A_y|$$

Figure 2C:
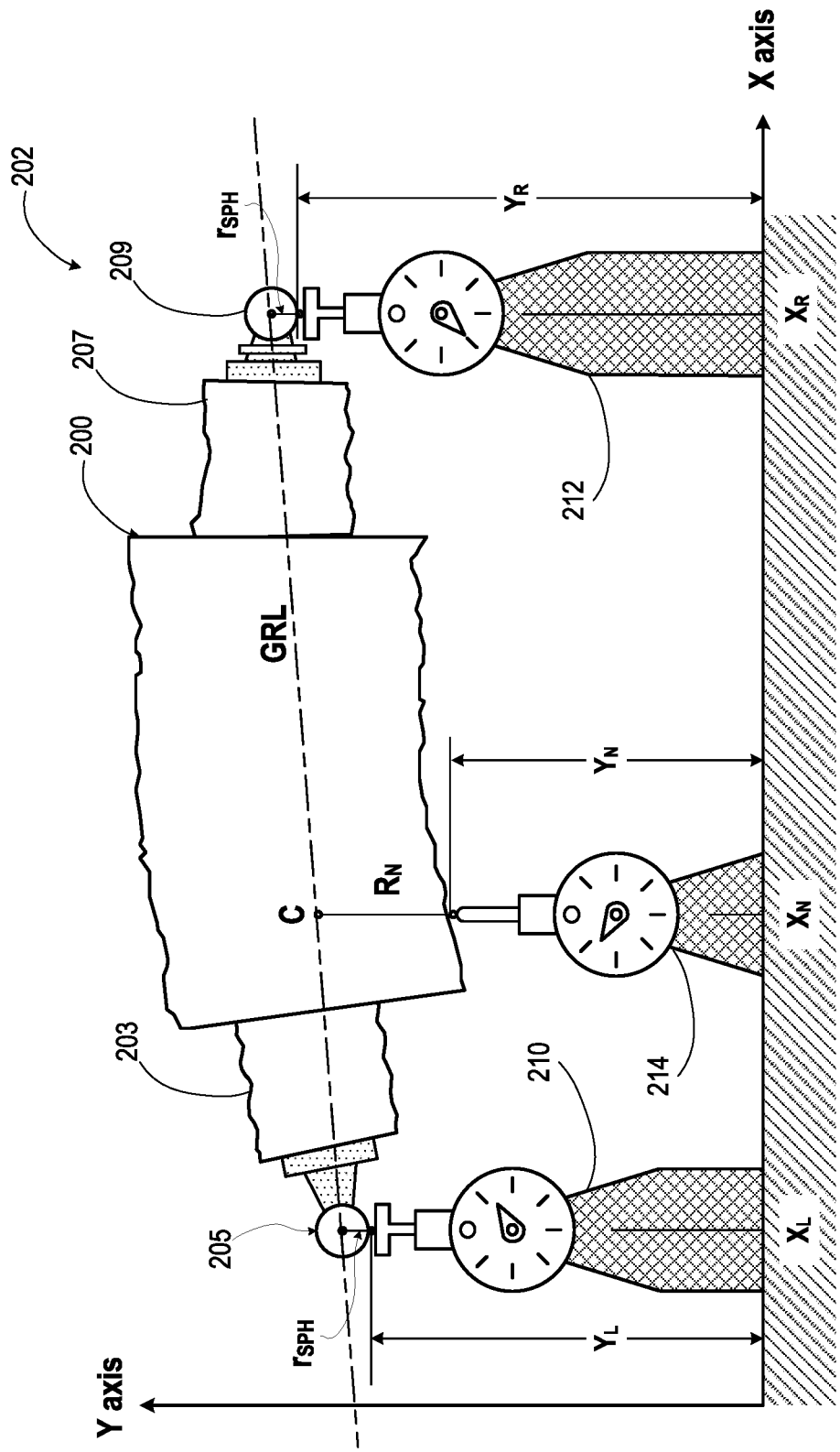
FIG. 2C illustrates a side view of a back-up or work roll positioned in a roundness measurement system, according to one or more embodiments.

FIG. 2C depicts a side view of the worn steel backup roll 200 positioned on the roundness measurement system 202 that measures the movement of center point "C". Left end 203 of backup roll 200 is supported by left ball bearing 205. Right end 207 of backup roll 200 is supported by right ball bearing 209.1n one or more embodiments, ball bearings 205, 209 are grade 5 ball bearings having 0.000005" sphericity for a respective radius $R_{SPH}$. Left support 210 of roundness measurement system 202 positions left ball bearing 205 for rotation around grinder rotation line (GRL) at horizontal position $x_L$ and vertical position $y_L$. Right support 212 of roundness measurement system 202 positions right ball bearing 209 for rotation around GRL at horizontal position $x_R$ and vertical position $y_R$. Measurement support 214 is longitudinally position along the x axis to measure points on roll 200.

Absolute values:

$$R_N = -y_N + (y_L + r_{SPH}) + \frac{x_N - x_L}{x_R - x_L}[(y_R + r_{SPH}) + (y_L + r_{SPH})]$$

wherein $i = -y_N$ and $m = (y_L + r_{SPH}) + \frac{x_N - x_L}{x_R - x_L}[(y_R + r_{SPH}) + (y_L + r_{SPH})]$.

Relative values:

$$\Delta R_N + \Delta y_N = (\Delta y_N) + \frac{x_N - x_L}{x_R - x_L}[\Delta y_R - \Delta y_L]$$

so $$\Delta R_N = -\Delta y_N + \left\{\Delta y_N + \frac{x_N - x_L}{x_R - x_L}[\Delta y_R - \Delta y_L]\right\}$$

where $\Delta i = -\Delta y_N$ (see Eqn. (4)) and $\Delta m =$ $$\left\{\Delta y_N + \frac{x_N - x_L}{x_R - x_L}[\Delta y_R - \Delta y_L]\right\} \text{ (see Eqn. (4)}$$

and note this is also movement of point C).

Figure 3A:
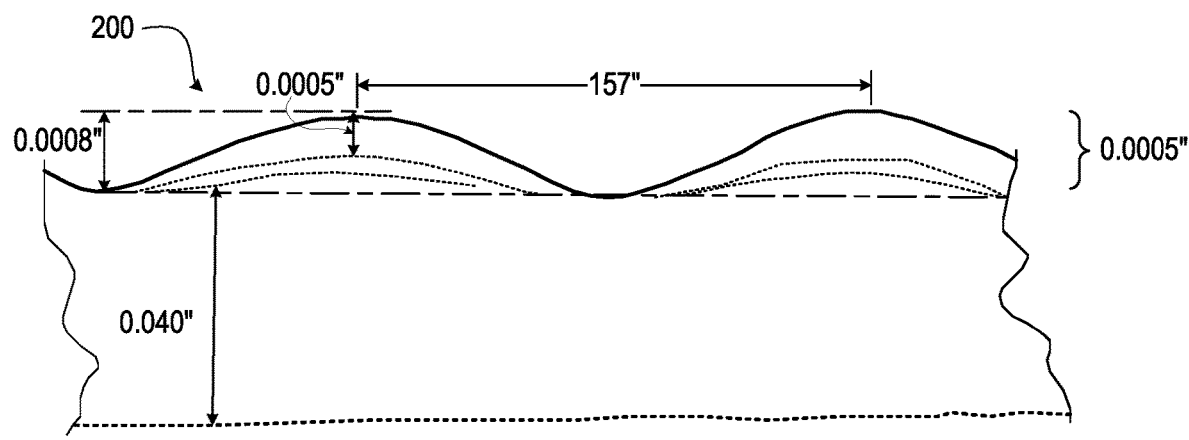
FIG. 3A illustrates a side detail view of upper surface of the back-up or work roll of FIG. 2, according to one or more embodiments.

FIG. 3A depicts a side cross sectional view of a top portion of backup roll 200 of 50" diameter after using the KTB technique that results in 0.0008" roundness error. Left and right peaks as compared to a center point between left and right peaks are longitudinally spaced by 157". Roll eccentricity compensation method utilizing negative feedback controls claims to take out 30%-60 more of the error. For example, eccentricity compensation can take out 50% of this error. Additional thickness variation removed according to present innovation removes 23.3% more.

For example, the conventional KTB machine can reduce out-of-round error by 73.3%. The present innovation will remove another 11.3%. of the 0.0008" thickness variation beyond roll eccentricity compensation. This will result in saving:

$$\frac{(0.113 * 0.0008''/2)}{0.040''} = \$1.07/\text{ton}$$

if the tonnage shipped to the customer.

$$0.113\% \text{ of } 1 \text{ ton@} \frac{\$960}{\text{ton}} = \$1.07/\text{ton}$$

If ABC Steel Company makes 7,000,000 tons/year and the value added percentage of this 7 megatons hovers around 80-85% of this value added product benefit from KTB process. For estimation purposes, consider that 75% of the value added product benefits from the conventional KTB's process then:

$$\frac{\$1.07}{\text{ton}} \times 0.80 \times 0.75 \times 7000000 \text{ tons} = \$4.5 \text{ million}$$

$$5 \text{ machines} \times \frac{700000}{\text{machine}} = \$3.5 \text{ million}$$

yields 0.78 years to break even at $4.5 million/year savings.

Figure 3B:
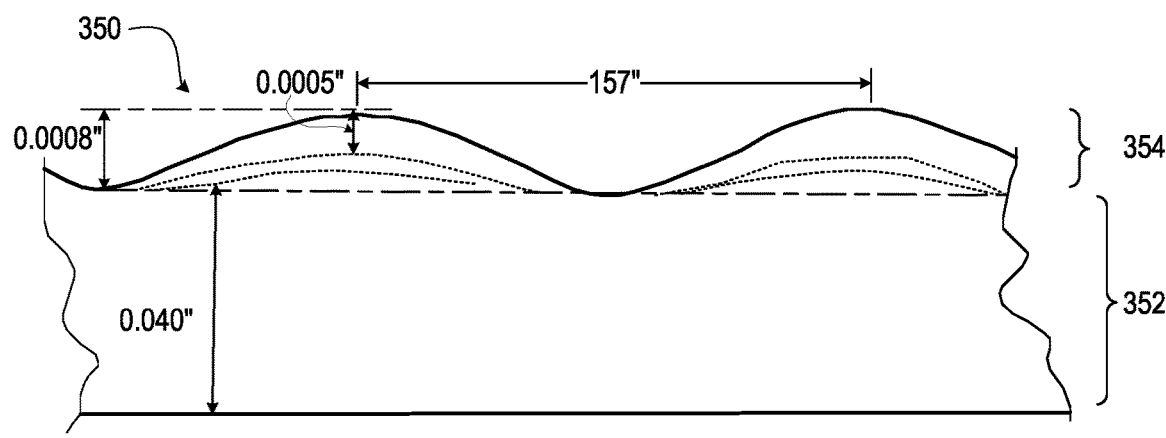
FIG. 3B illustrates a side detail view of a product strip produced by the backup or work roll of FIG. 3A, according to one or more embodiments.

FIG. 3B illustrates a side lengthwise view of product strip 350 produced by the backup or work roll 100 of FIG. 3A. Product strip 350 of rolled steel or aluminum has a useful thickness 352 of 0.040 inches and fluctuating outer thicknesses 354 of material that are not wanted. Conventionally, the useful thickness 352 is controlled very accurately with modern sensors and automated computer controls. However, these controls cannot eliminate the fluctuating outer thicknesses 354 of material above the 0.040 inch being caused by eccentric rolls. A 50-inch diameter back-up roll body that is not concentric to its roll necks results in a cyclic error every 157 inches along the circumferential length of the product strip 350.

Steel purchaser has ordered material for stamping exterior car body parts that need to be 0.040 inches thick for the stamped part. If the part is too thick, it may cause a press jam or the shape of the part won't be correct when released from the presses dies. If the part is too thin. The material may tear apart during the press drawing process. Also, the part may not have the correct shape after being released from the die. Therefore. The product is the most valuable the closer its thickness is held to the design thickness parameters.

The present invention will measure large rolls (2 tons to 100 tons) to a 0.0001" accuracy. This measuring technique was originally developed for the steel industry, but it can be useful for aluminum flat rolled products, measuring jet engine main rotor assemblies, steam turbine rotor assemblies, printing roll image cylinders, rotogravure rolls and calendar rolls.

Figure 4:
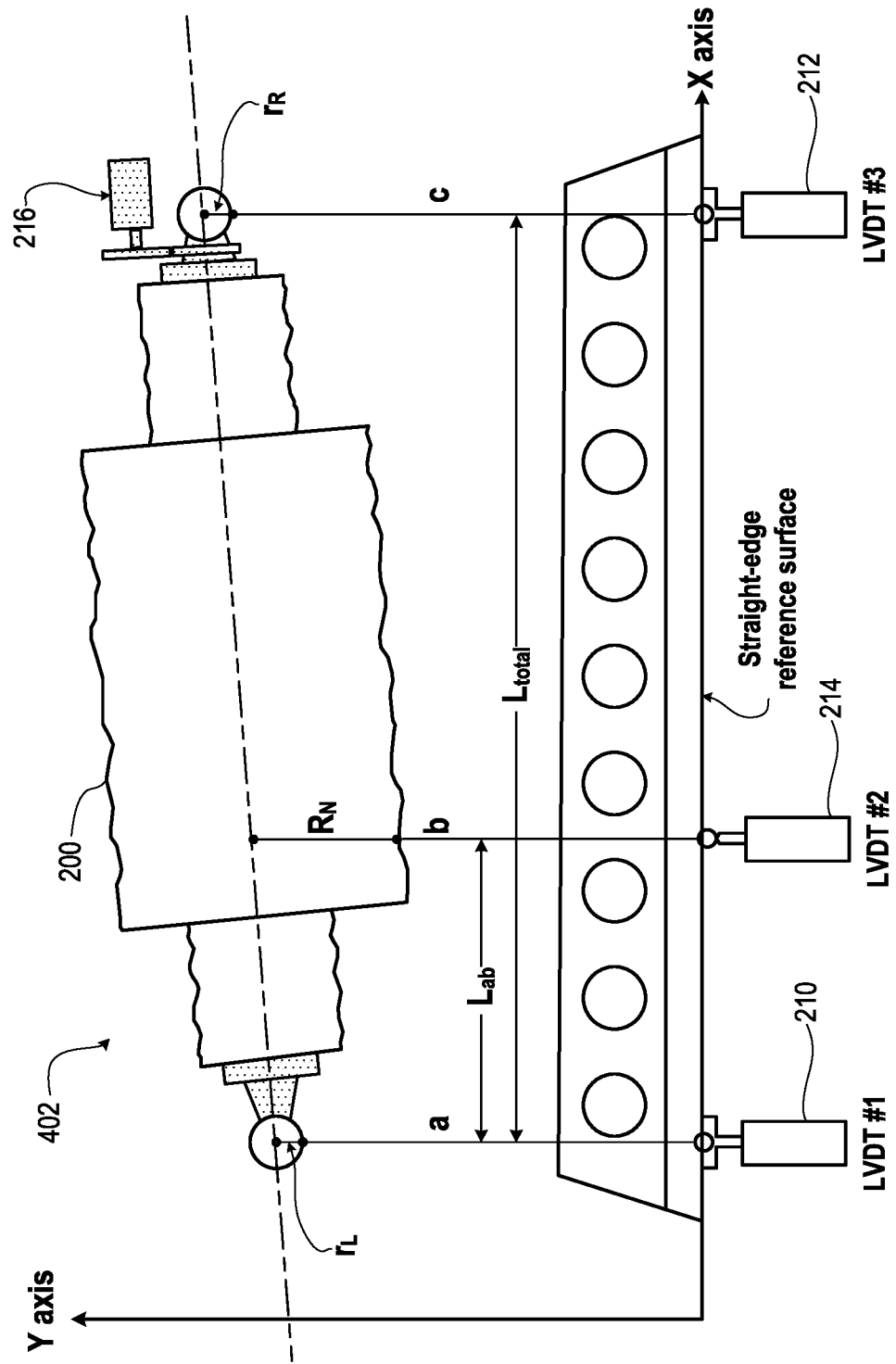
FIG. 4 illustrates a side view of roundness measurement system using absolute longitudinal position measurements, according to one or more embodiments.

FIG. 4 depicts a roundness measurement system 402 supporting backup roll 200 and that uses left, measuring and right linear variable differential transformers (LVDTs) to detect longitudinal position of left support 210, measurement support 214, and right support 212. Rotation of the backup roll 200 is detected by rotary encoder 216.

Relative values:

$$\Delta R_N + \Delta y_N = -b + \frac{L_{AB}}{L_{total}}(c + r_R) + \left(\frac{L_{total} - L_{ab}}{L_{total}}\right)(a + r_L)$$

Absolute Value:

$$R_N = -b + \frac{L_{AB}}{L_{total}}(c + r_R) + \left(\frac{L_{total} - L_{ab}}{L_{total}}\right)(a + r_L)$$

FIGS. 5-23 illustrate development of a high precision roundness measuring machine using descriptive and analytical geometry techniques.

Figure 5:
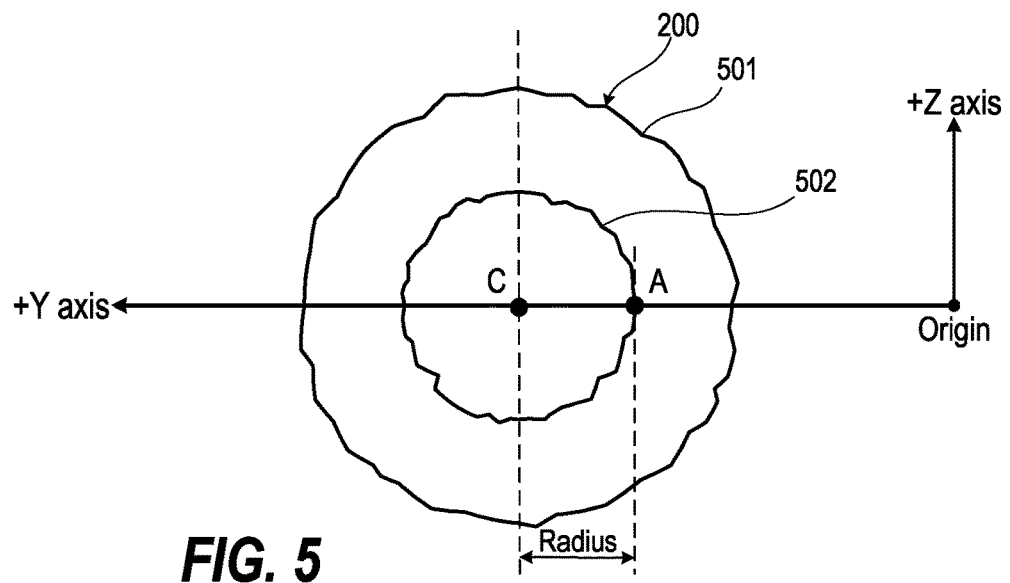
FIG. 5 depicts an end view of a steel millwork roll, according to one or more embodiments.

FIG. 5 depicts an end view of a steel millwork roll 200 having roll body 501 and a roll neck 502 having a radius $\overline{CA}$. The X-Y plane is depicted as being horizontal and viewed edge on A wavy line or circle is used to imply an unmeasured and slightly out-of-round roll. It is estimated that work rolls and backup rolls are currently within 0.0002 inch to 0.0006 inch radial variation and which should be 0.000040 inch or 40 millionths inch or less to roll in excellent product. The control of roundness begins with the accurate measurement of the radial distance from a single central point (Point C) to the outer surface of the object (Point A) on the roll neck 501 at many stations along the roll's axis.

Figure 6:
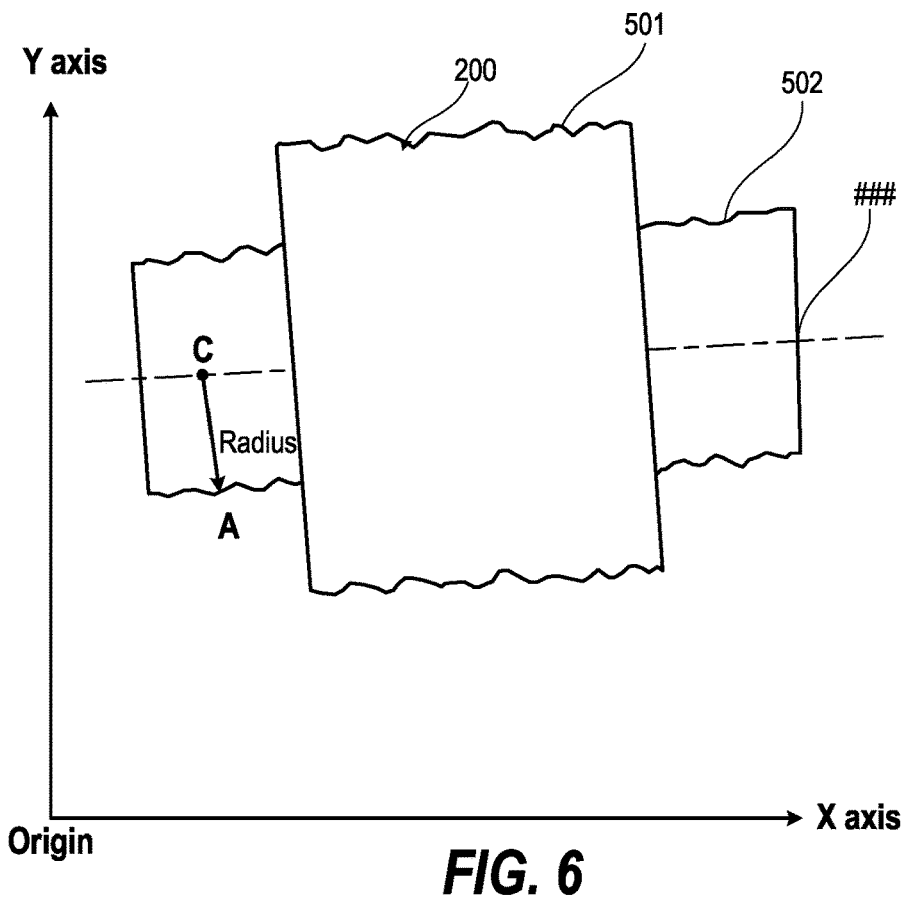
FIG. 6 depicts a plan view of a work roll viewed in the x-y horizontal plane (z=0), according to one or more embodiments.

FIG. 6 depicts a plan view of a work roll 200 viewed in the x-y horizontal plane (z=0).

Figure 7:
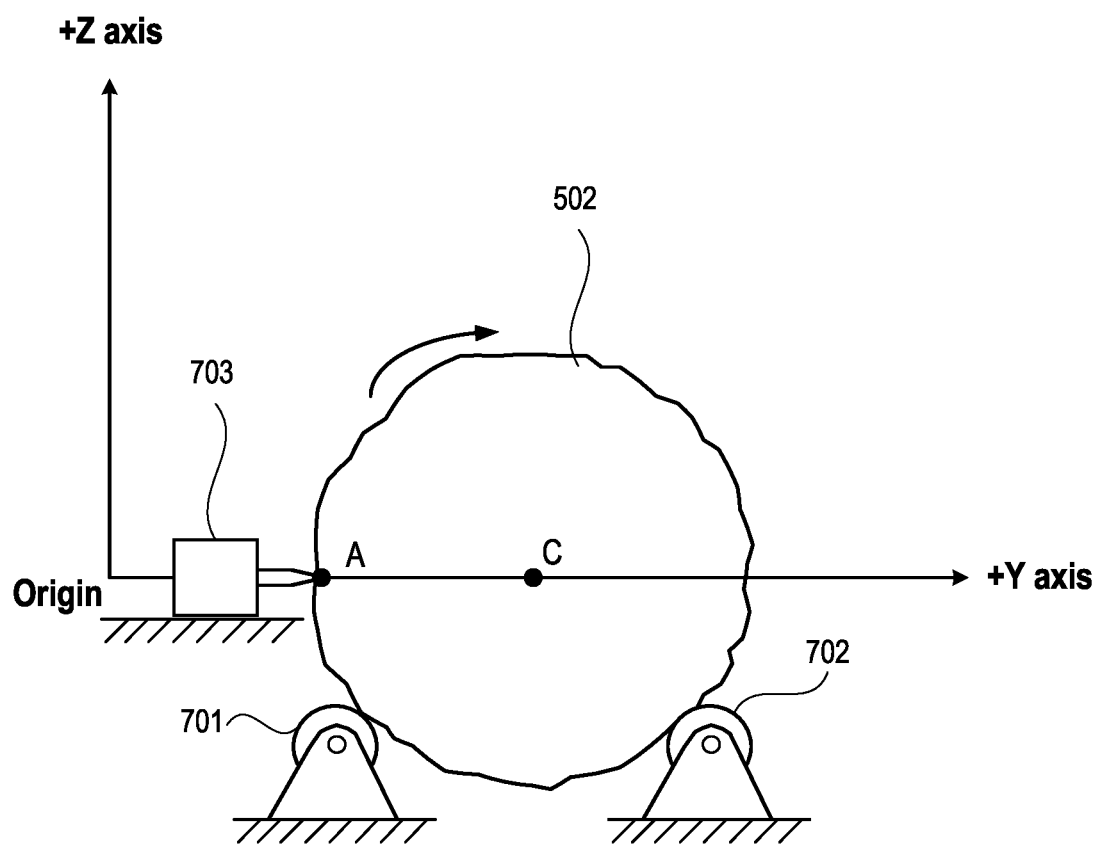
FIG. 7 depicts an end view of a roll neck resting on powered rollers, according to one or more embodiments.

FIG. 7 depicts an end view of a roll neck 502 viewed in the −X axis direction resting on powered rollers 701 and 702 that rotate the roll neck 502 at 1 to 3 revolutions per minute (rpm). A displacement transducer 703 detects a point A. This illustration points out the difficulty in detecting the position of Point C because of its inaccessibility.

Figure 8:
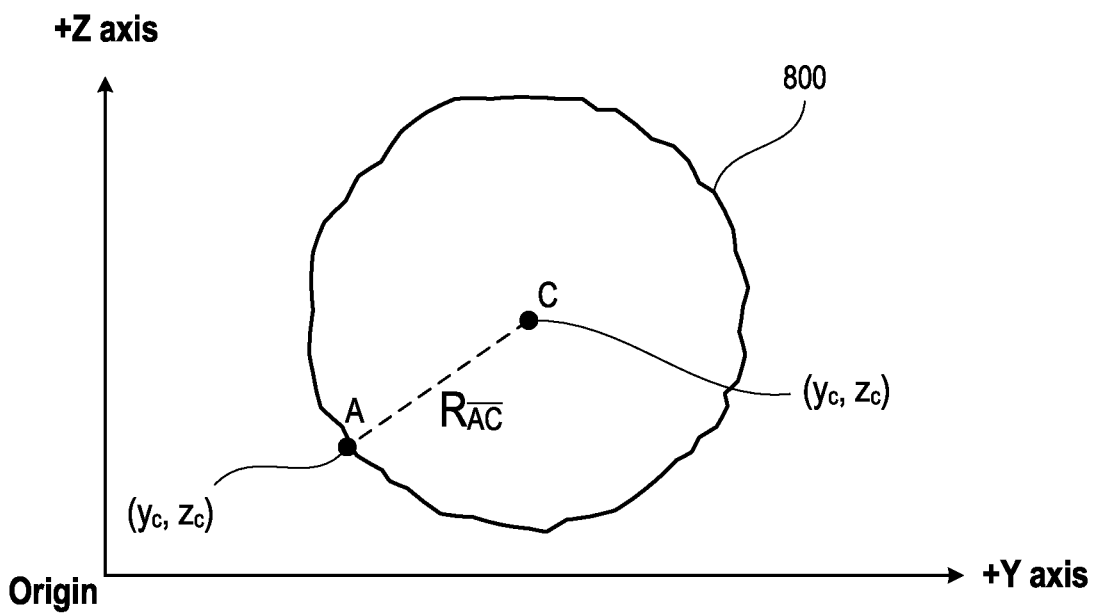
FIG. 8 depicts an end view of a non-round object and the determination of a radius in any angular position by knowing the y and z coordinates of the center Point C and the surface Point. A, according to one or more embodiments.

FIG. 8 depicts an end view of a non-round object 800 and the determination of a radius in any angular position by knowing the y and z coordinates of the center Point C and the surface Point. A.

Figure 9:
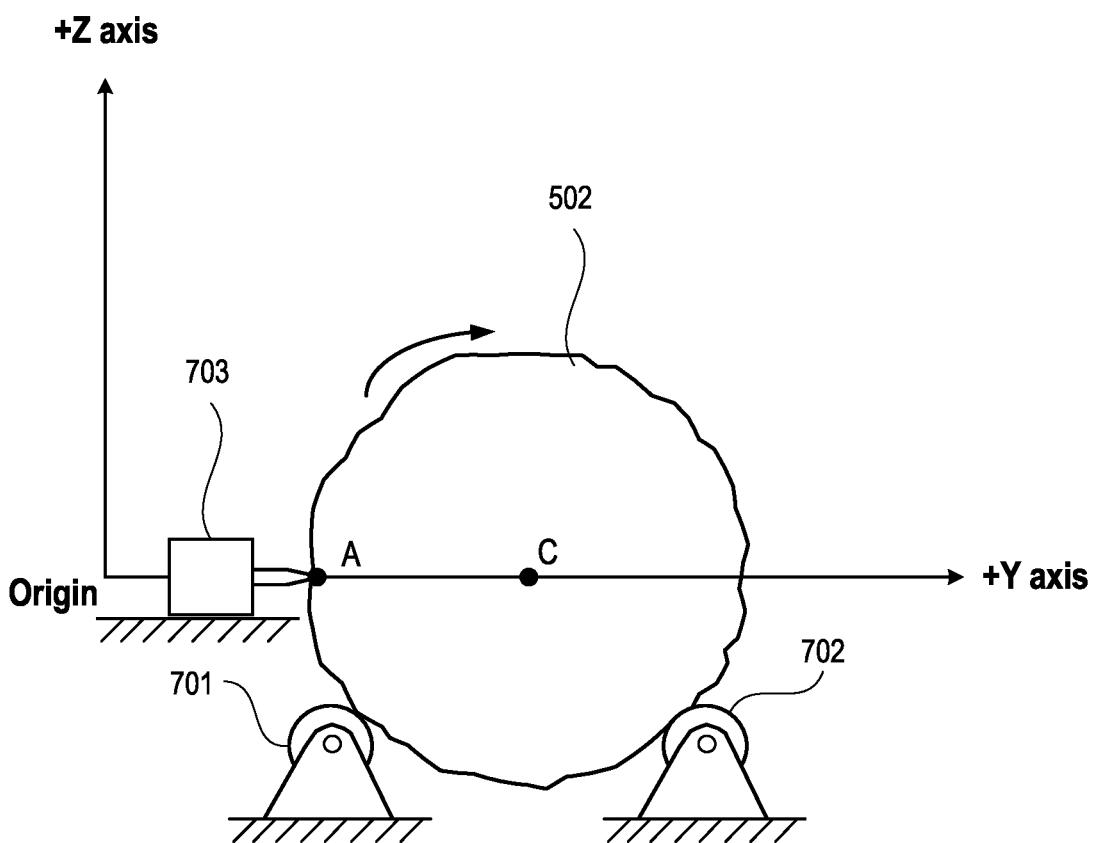
FIG. 9 depicts an end view of a roll neck resting on powered rollers and surface Point A's y-component being detected when radius AC is in the horizontal x-y plane, according to one or more embodiments.

FIG. 9 depicts an end view of a roll neck 502 resting on powered rollers and surface Point A's y-component being detected when radius AC is in the horizontal x-y plane. The y and z components for Point A are easily measured, but Point C is not accessible. It should also be mentioned that Point C will be moving out of the x-y plane because of the object's roundness error. It is expected to be small enough to have a cosine error of only about 0.0000015 inch. Larger rolls will have even smaller cosine errors.

Figure 10:
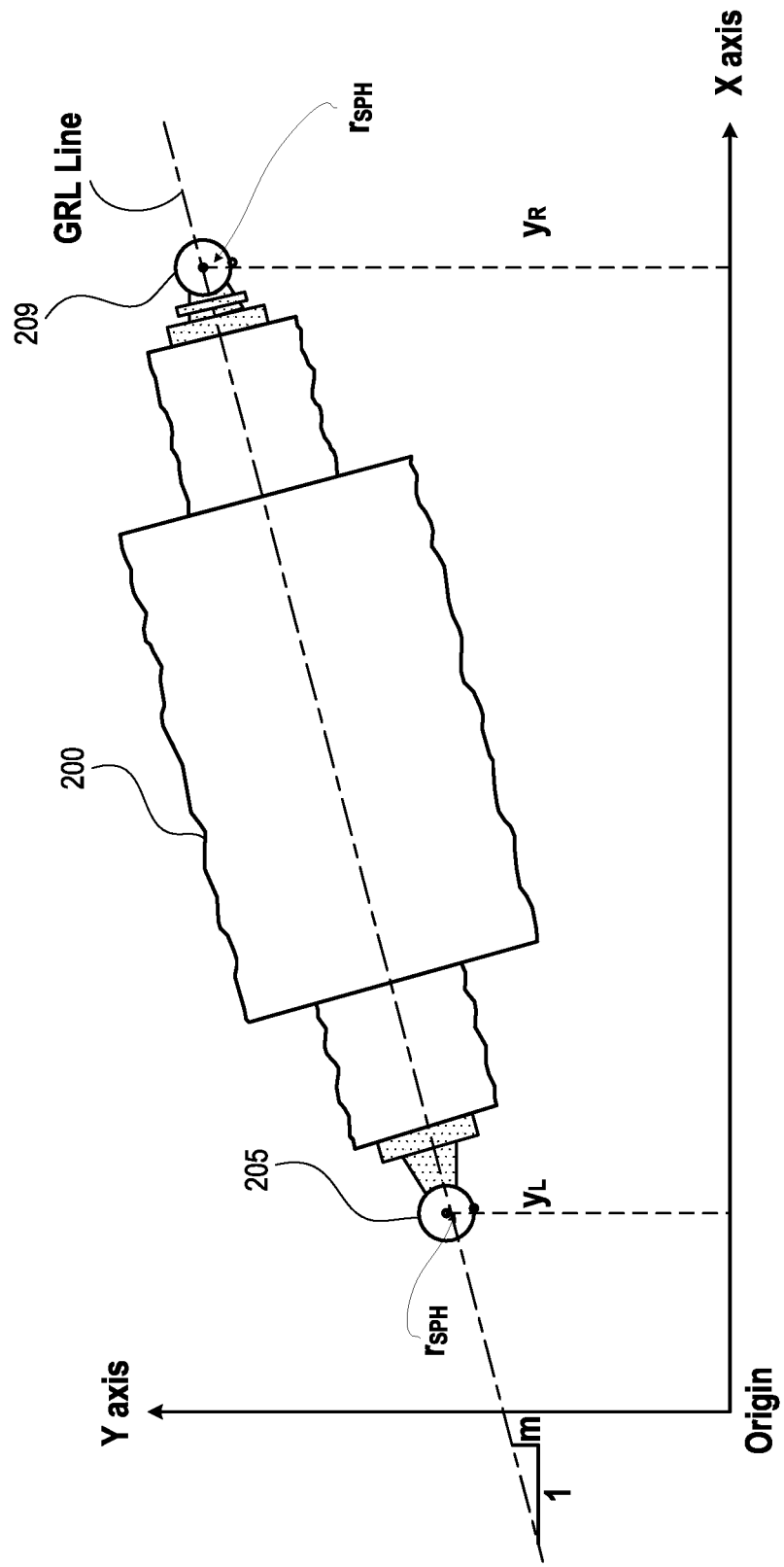
FIG. 10 depicts a plan view of a work roll with all cylindrical surfaces having Grade five (5) ball bearings mounted at each end of the roll to establish a gage reference line (GRL) on the roll, according to one or more embodiments.

FIG. 10 depicts a plan view of a work roll 200 with all cylindrical surfaces having Grade five (5) ball bearings 205, 209 mounted at each end of the roll 200 to establish a gage reference line (GRL) on the roll. Measuring the Y-coordinate fluctuation of these two spheres allows for the measurement of precession (angular motion or slope change of the GRL in the XY plane) and translational motion of the GRL (changing Y-intercept).

Figure 11:
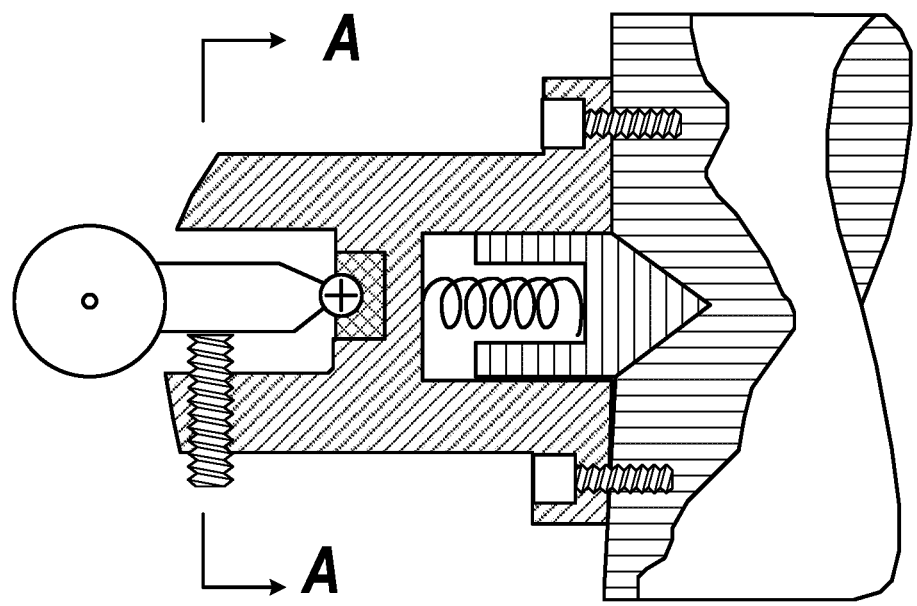
FIG. 11 depicts a side sectional view of the left reference sphere assembly shown bolted rigidly to a roll end, according to one or more embodiments.
Figure 12:
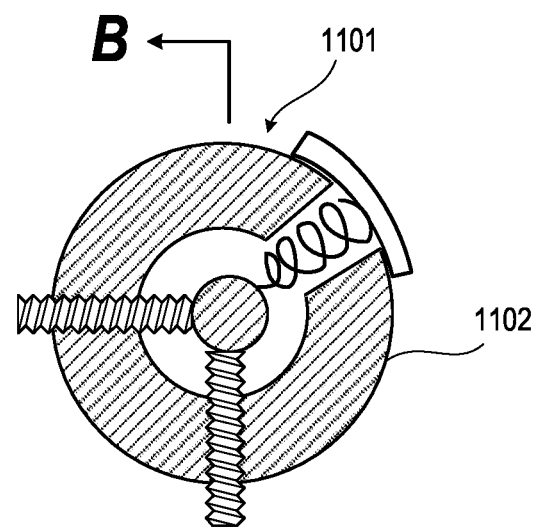
FIG. 12 depicts a front sectional view of the left reference sphere assembly of FIG. 11 shown bolted rigidly to a roll end, according to one or more embodiments.

FIG. 11 depicts a side sectional view of the left reference sphere assembly 1101 shown bolted rigidly to a roll end 1102. FIG. 12 depicts a front sectional view of the left reference sphere assembly 1101 shown bolted rigidly to a roll end 1102. Note the setscrew adjusting hardware to minimize the run out of the sphere.

Figure 13:
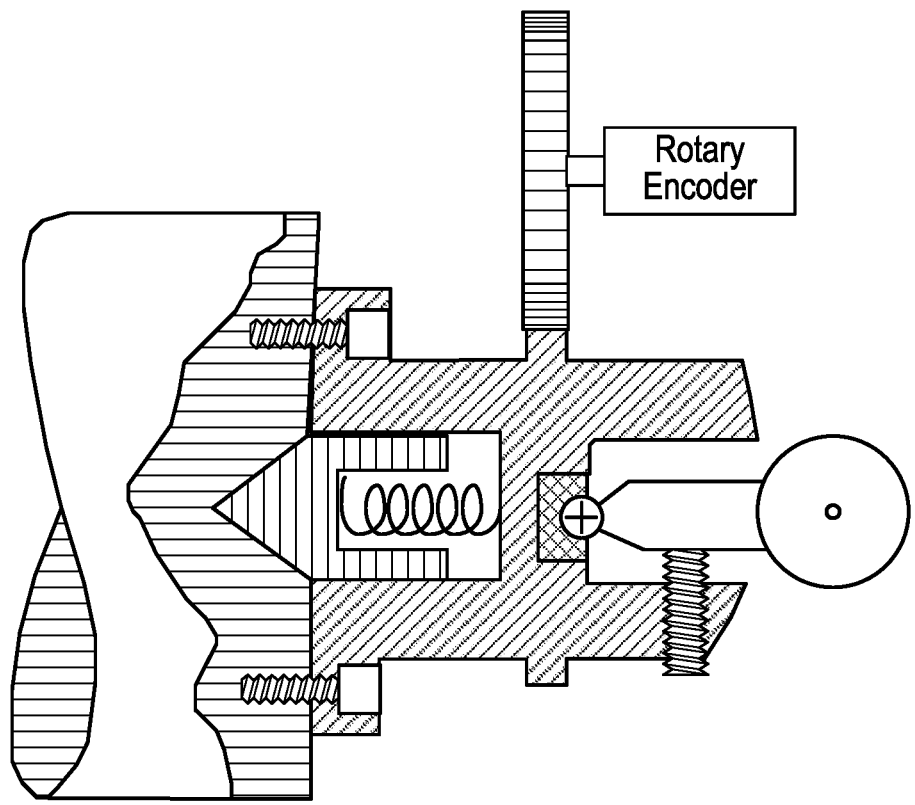
FIG. 13 depicts a sectional view of the right reference fear assembly along with a one-to-one gearset to drive a rotary angle encoder, according to one or more embodiments.

FIG. 13 depicts a sectional view of the right reference sphere assembly along with a one-to-one gearset to drive a rotary angle encoder. This assembly functions just like it's mate in FIG. 12, but also accomplishes two additional tasks. These are (1) a rotary encoder for detecting angular position of the roll; and (2) an additional displacement transducer contacting the reference sphere to detect axial displacement of the roll to compensate for erroneous measurements of the radius due to tapered neck movements in the axial direction.

Figure 14:
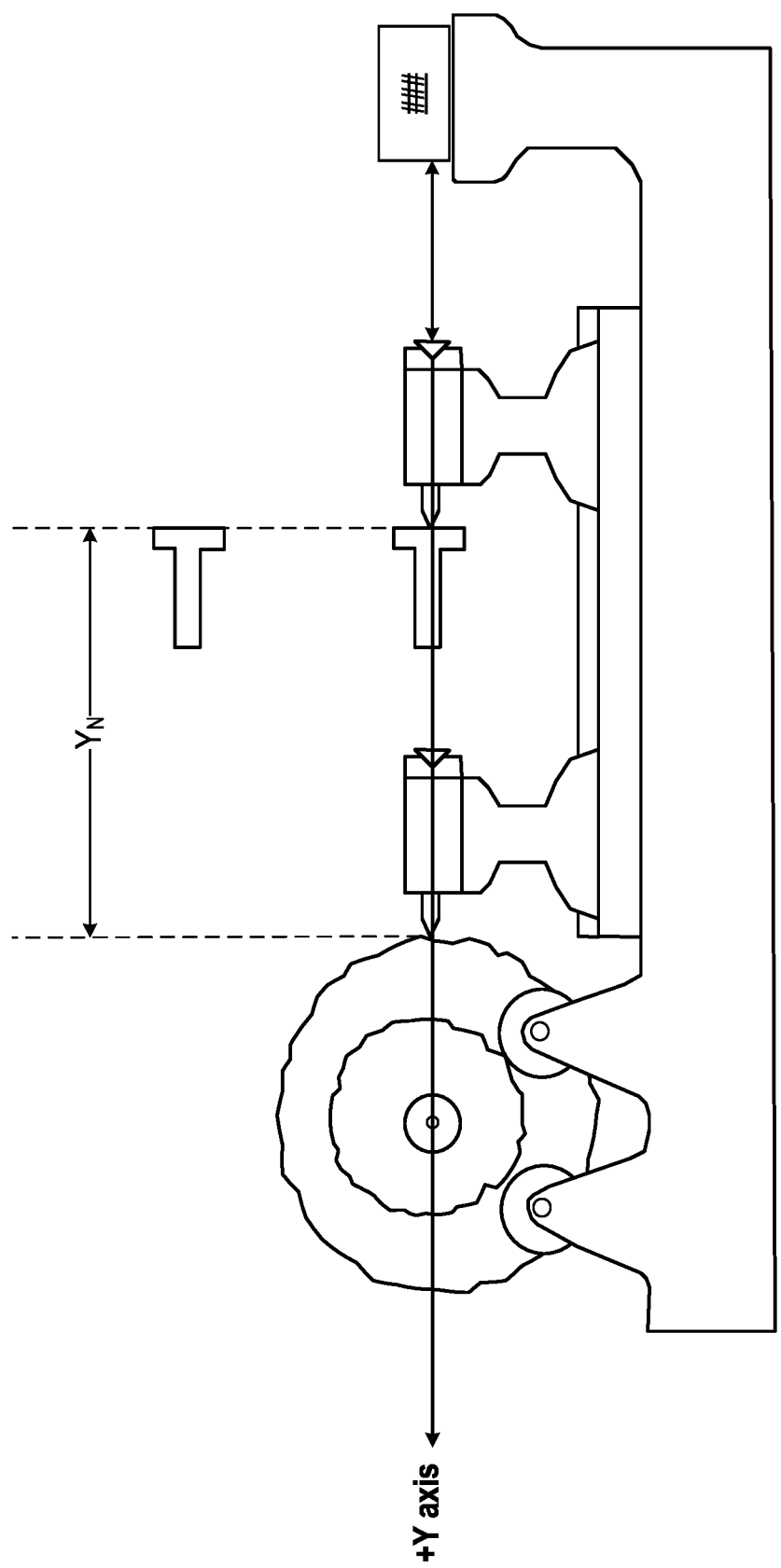
FIG. 14 depicts an end view of a roll located in a machine frame and the hardware and procedures for obtaining $Y_N$ values (absolute values) of all the radial probes, according to one or more embodiments.

FIG. 14 depicts a plan view of a work roll showing the use of a straightedge, which represents the X axis or y=0 position, to zero out all radial probes in order to begin the measurement of absolute Y values. This is critical because it introduces a straight edge, allowing absolute radius measuring.

FIG. 14 depicts an end view of a roll located in a machine frame and the hardware and procedures for obtaining $Y_N$ values (absolute values) of all the radial probes.

Figure 15:
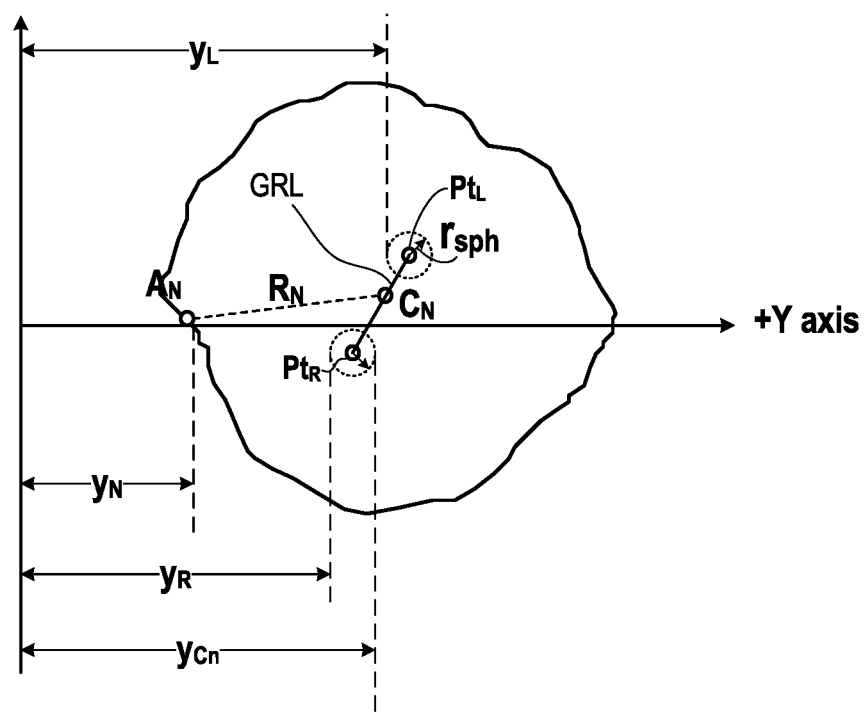
FIG. 15 depicts an end view of a roll showing how the interior Point $C_N$ is detected indirectly by the two reference spheres for its y-coordinate position, according to one or more embodiments.

FIG. 15 depicts an end view of a roll showing how the interior Point $C_N$ is detected indirectly by the two reference spheres for its y-coordinate position. The positions of Points R and L above and below the x-y plane have been exaggerated for the sake of clarity.

Figure 16:
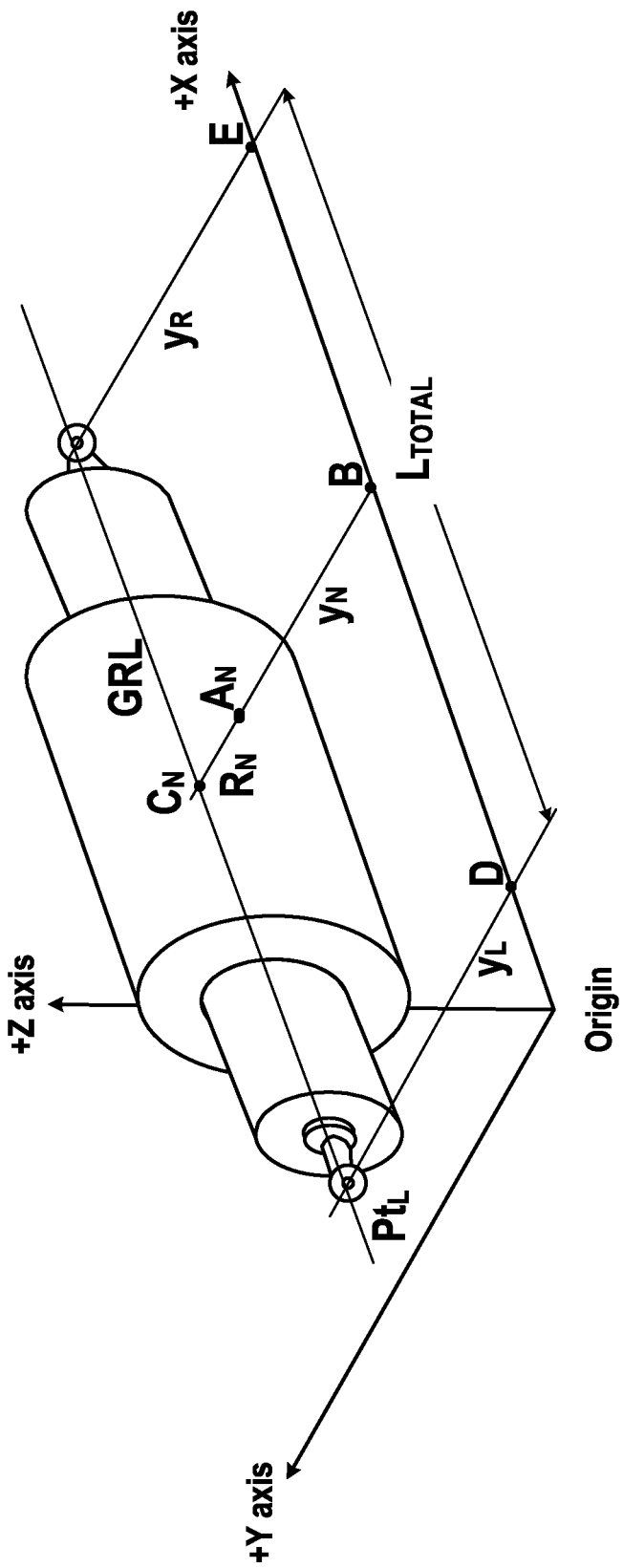
FIG. 16 depicts an isometric view of a work roll in a x-y-z coordinate system. This provides a 3D visualization of the roundness measuring system, according to one or more embodiments.

FIG. 16 depicts an isometric view of a work roll in a x-y-z coordinate system. This provides a 3D visualization of the roundness measuring system of the present invention.

Figure 17:
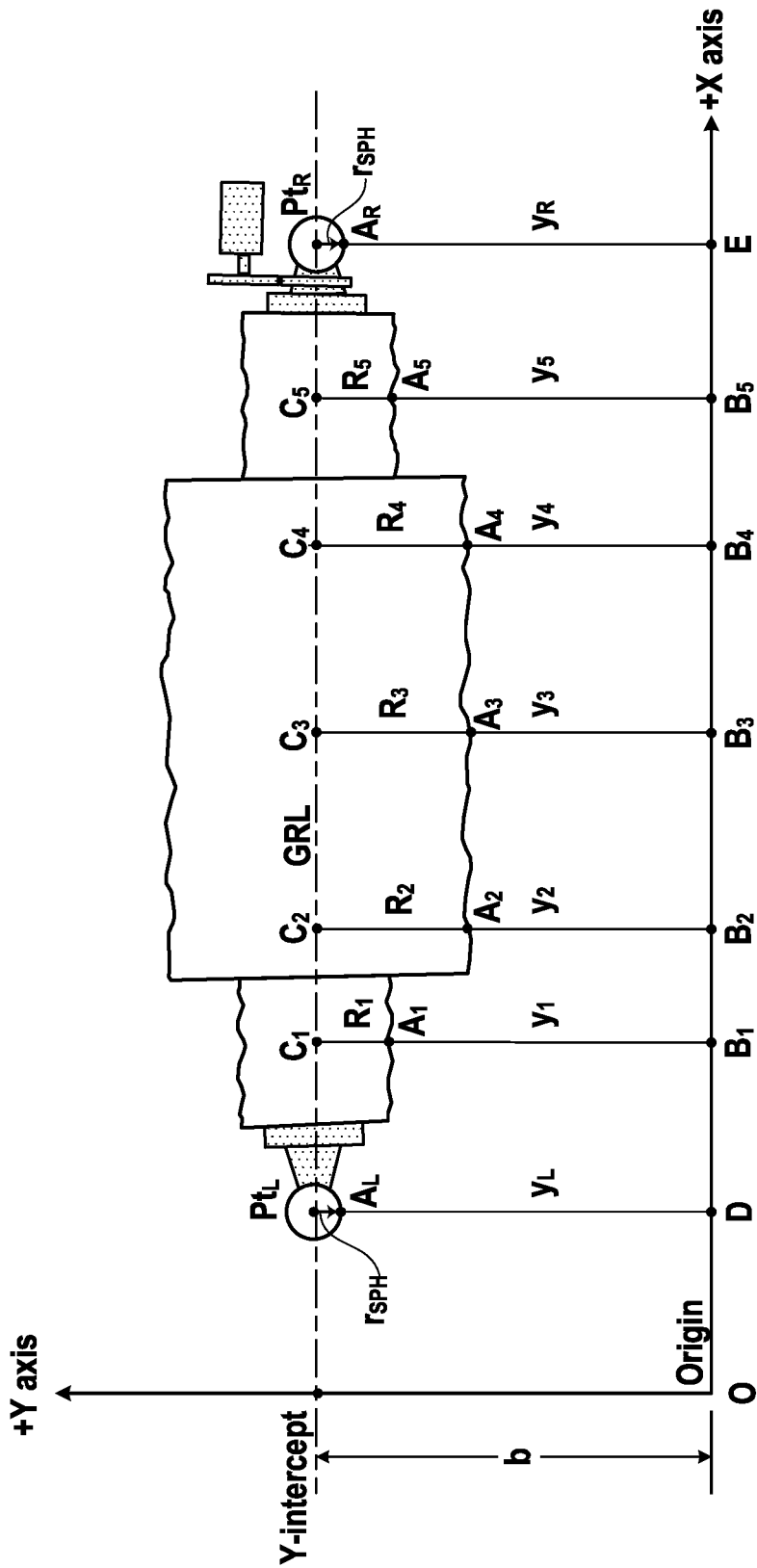
FIG. 17 depicts a plan view of a work roll having five (5) station points for measuring roundness of both necks and three (3) measurements of the roll's body for size, crown and taper, according to one or more embodiments.

FIG. 17 depicts a plan view of a work roll having five (5) station points for measuring roundness of both necks and three (3) measurements of the roll's body for size, crown and taper. Additional probes may be used to obtain a finer mesh of data points to more closely approximate the true topography of the necks and body of the roll.

Figure 18:
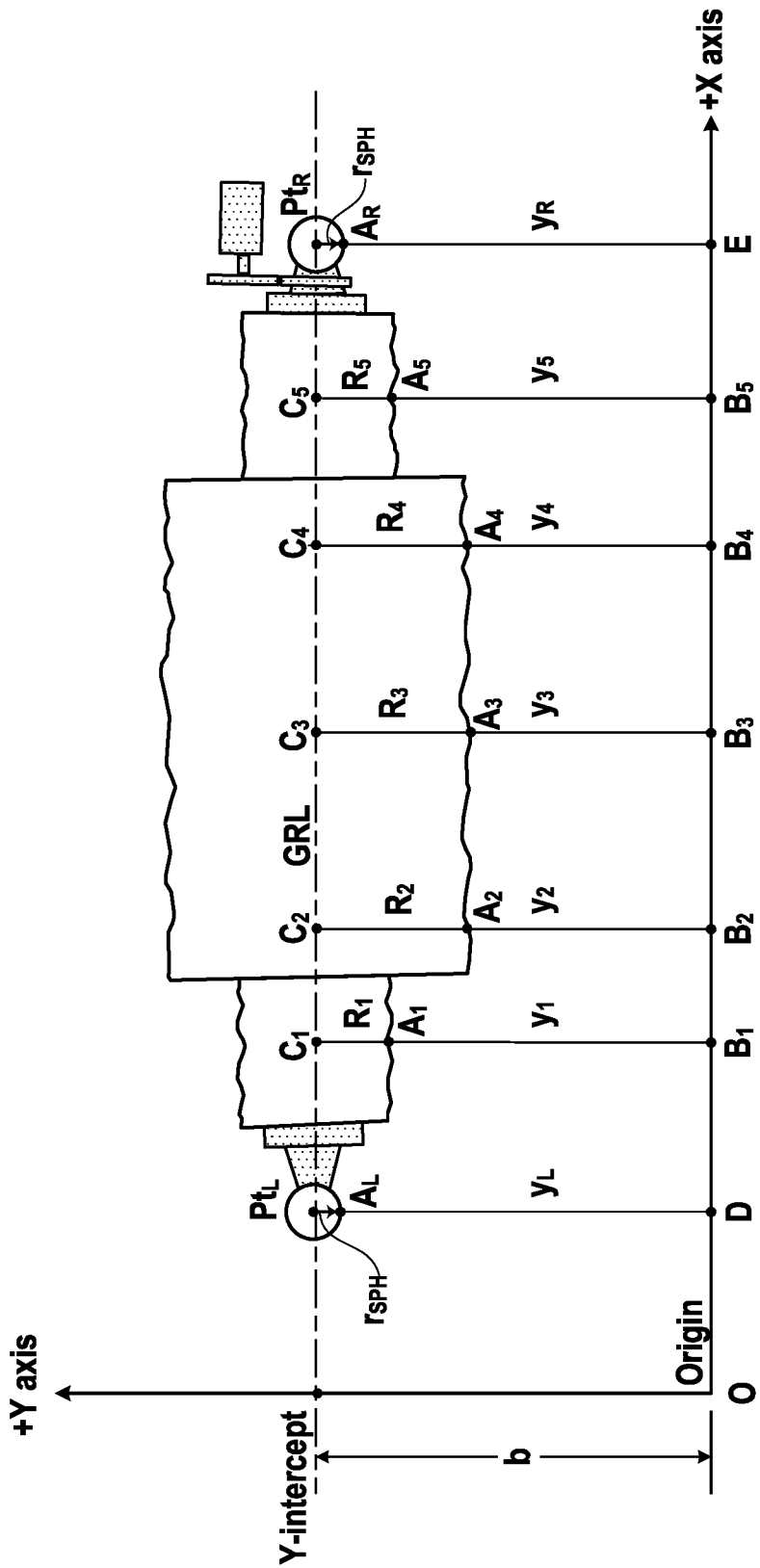
FIG. 18 depicts a plan view of a backup roll and the system for measuring a conical shape for roundness and showing how to compensate for the error when the roll shifts its axial position, according to one or more embodiments.

FIG. 18 depicts a plan view of a backup roll and the system for measuring a conical shape for roundness and showing how to compensate for the error when the roll shifts its axial position. Note the additional term $\Delta X_{RXIA} \cdot (-\tan \gamma)$ in the equation for $R_N$.

Figure 19:
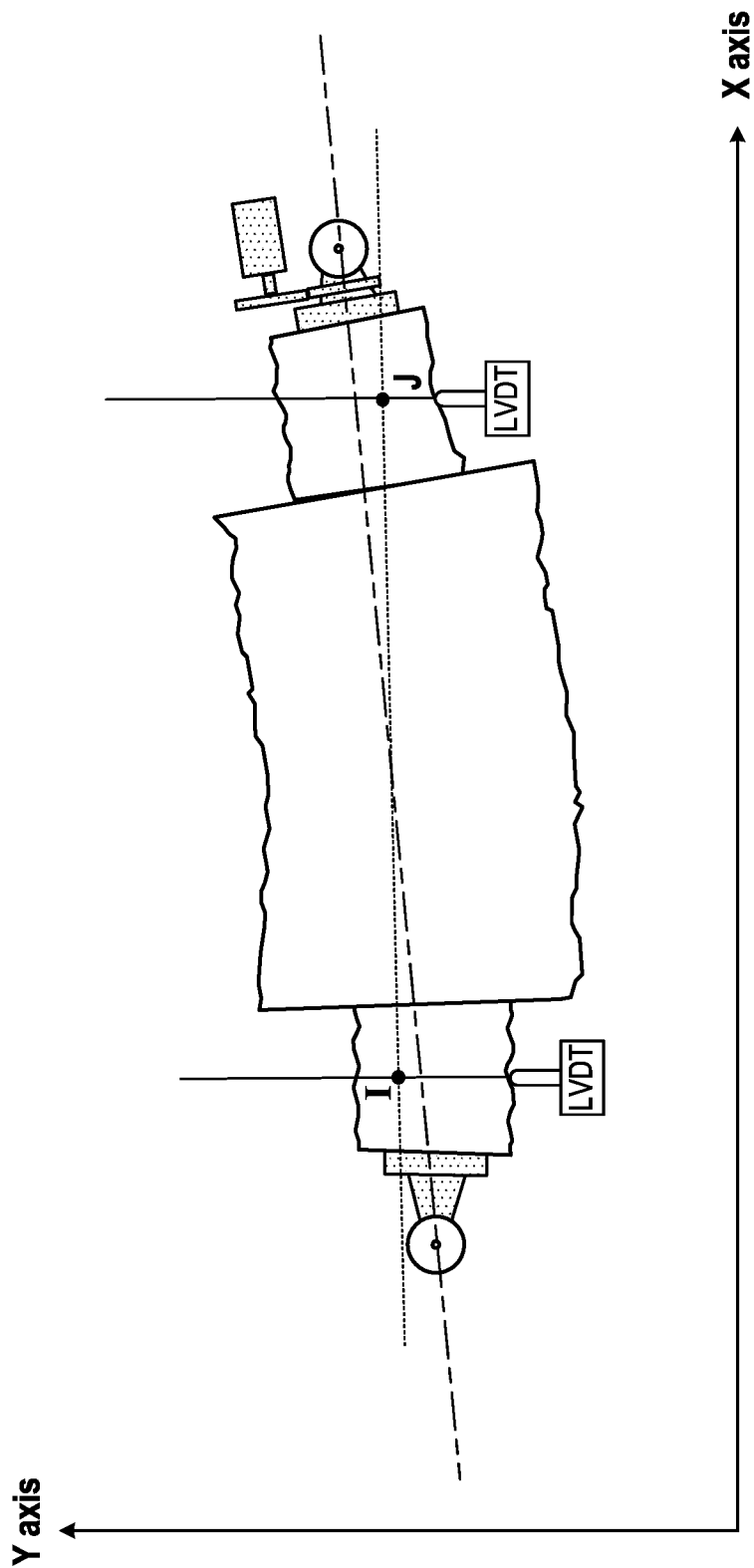
FIG. 19 depicts a plan view of a work roll depicting how to determine the axis of the roll. It is important to note that the GRL line is not the axis of the roll but is very close to the roll's axis, according to one or more embodiments.

FIG. 19 depicts a plan view of a work roll depicting how to determine the axis of the roll. It is important to note that the GRL line is not the axis of the roll but is very close to the roll's axis. In this measuring system, the location of the axis is the last parameter to be computed. The axis of the roll is defined as the straight line joining the computed centers (Points I and J) of the bearing midplane of each roll neck. This definition best describes the roles axis of rotation when in use while rolling steel. The GRL line serves as a temporary reference line from which to measure radial line lengths during the gauging process. In one or more embodiments, Points I and J's coordinate position, the Y&Z coordinates, are found by a least squares, best fit mathematical search routine.

Figure 20:
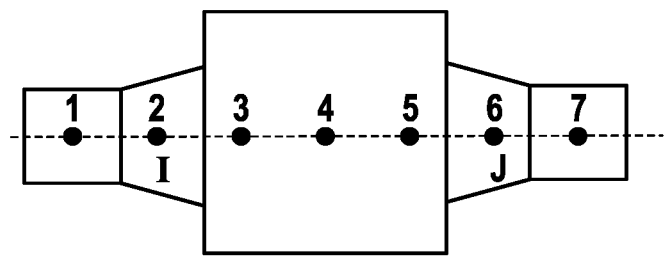
FIG. 20 depicts a view of a backup roll and the seven (7) locations along its axis where roundness measurements have been made in this example, according to one or more embodiments.
Figure 21:
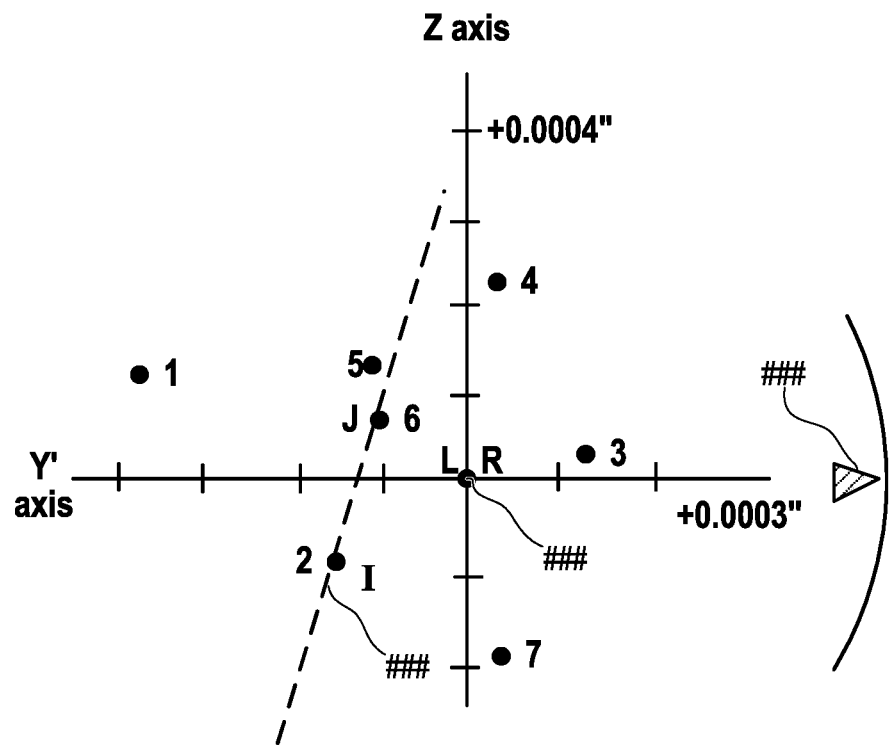
FIG. 21 depicts a graph of the seven (7) computed centers position when viewed looking along the roll's axis, according to one or more embodiments.

FIG. 20 depicts a view of a backup roll and the seven (7) locations along its axis where roundness measurements have been made in this example. FIG. 21 depicts a graph of the seven (7) computed centers position when viewed looking along the roll's axis. Also shown is a highly magnified graph centered on the GRL line showing the location of the seven computed centers with respect to the GRL line. Notice that the roll's access is being defined by the line joining centers #2 and #6, which are the centers at the bearing's midplane on the tapered necks.

Figure 22:
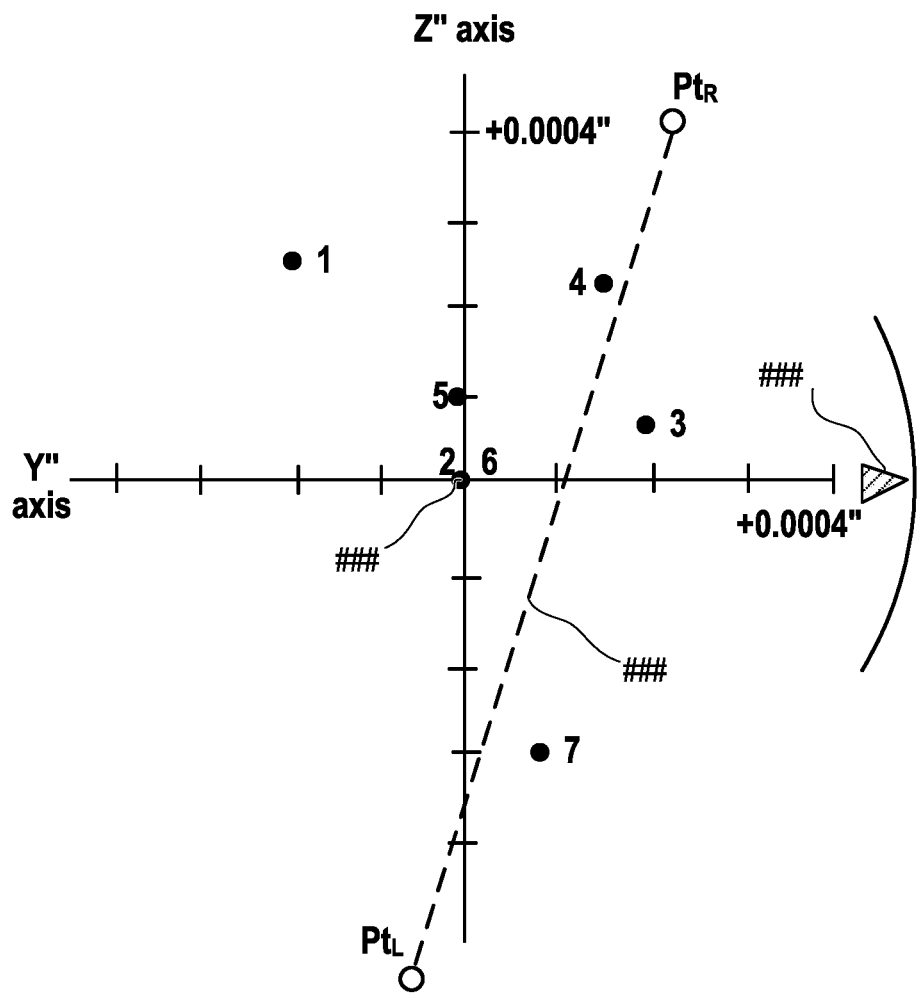
FIG. 22 depicts another graph of the seven (7) computed centers position when viewed looking along the roll's axis, according to one or more embodiments.

FIG. 22 depicts a graph of the seven (7) computed centers position when viewed looking along the roll's axis. This view is slightly different from viewing along the GRL line as these two lines are not quite parallel nor do they intersect. All seven (7) points have moved to a slightly different relative-to-each-other position from their positions in FIG. 20. Notice in this example that a curved line passing through these seven computed centers in numerical order would describe a helical path. So, this roll has a very slight corkscrew shape.

Figure 23:
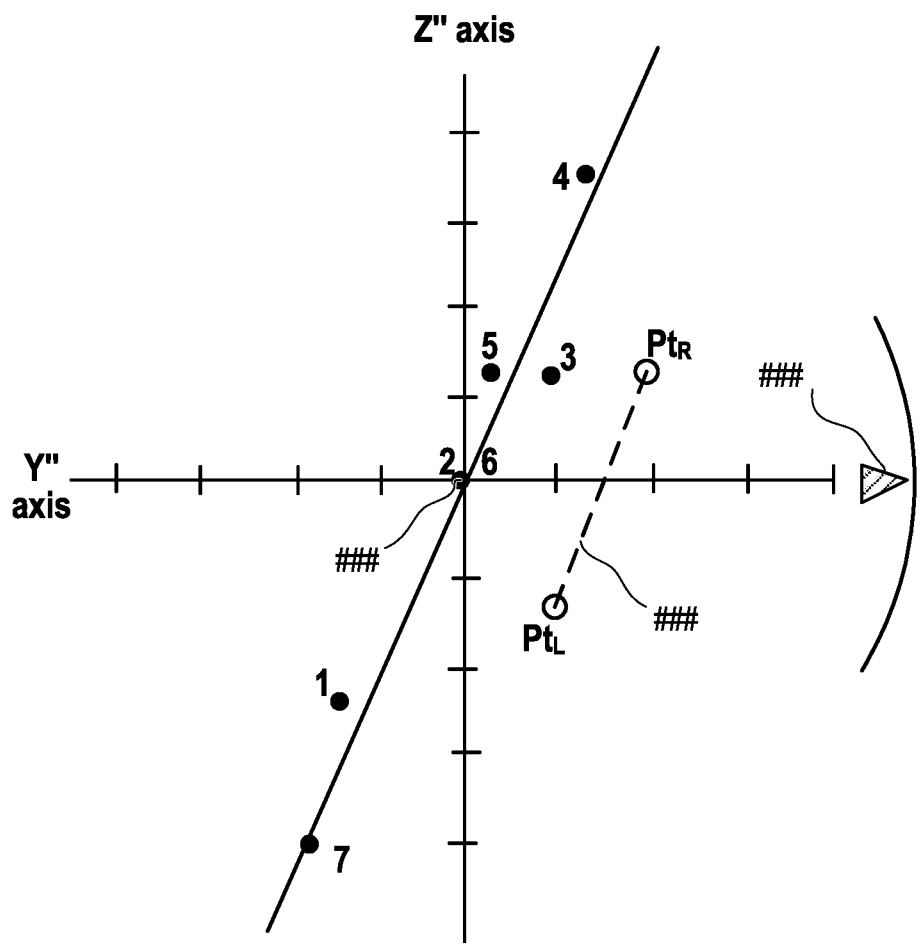
FIG. 23 depicts a highly magnified end view of the backup role of FIGS. 21 and 22 where all the computed centers of the roll are close to a straight line and the numbered sequence shows a simple bent roll, according to one or more embodiments.

FIG. 23 depicts a highly magnified end view of the backup role of FIGS. 21 and 22 where all the computed centers of the roll are close to a straight line and the numbered sequence shows a simple bent roll. If measuring of rolls for roundness, concentricity, and axial straightness are performed on a regular basis, it may be possible to show the decreasing distortion of the role shape with time as the residual stresses of a roll arm massage to lower values by the cyclic forces during the rolling process.

Figure 24:
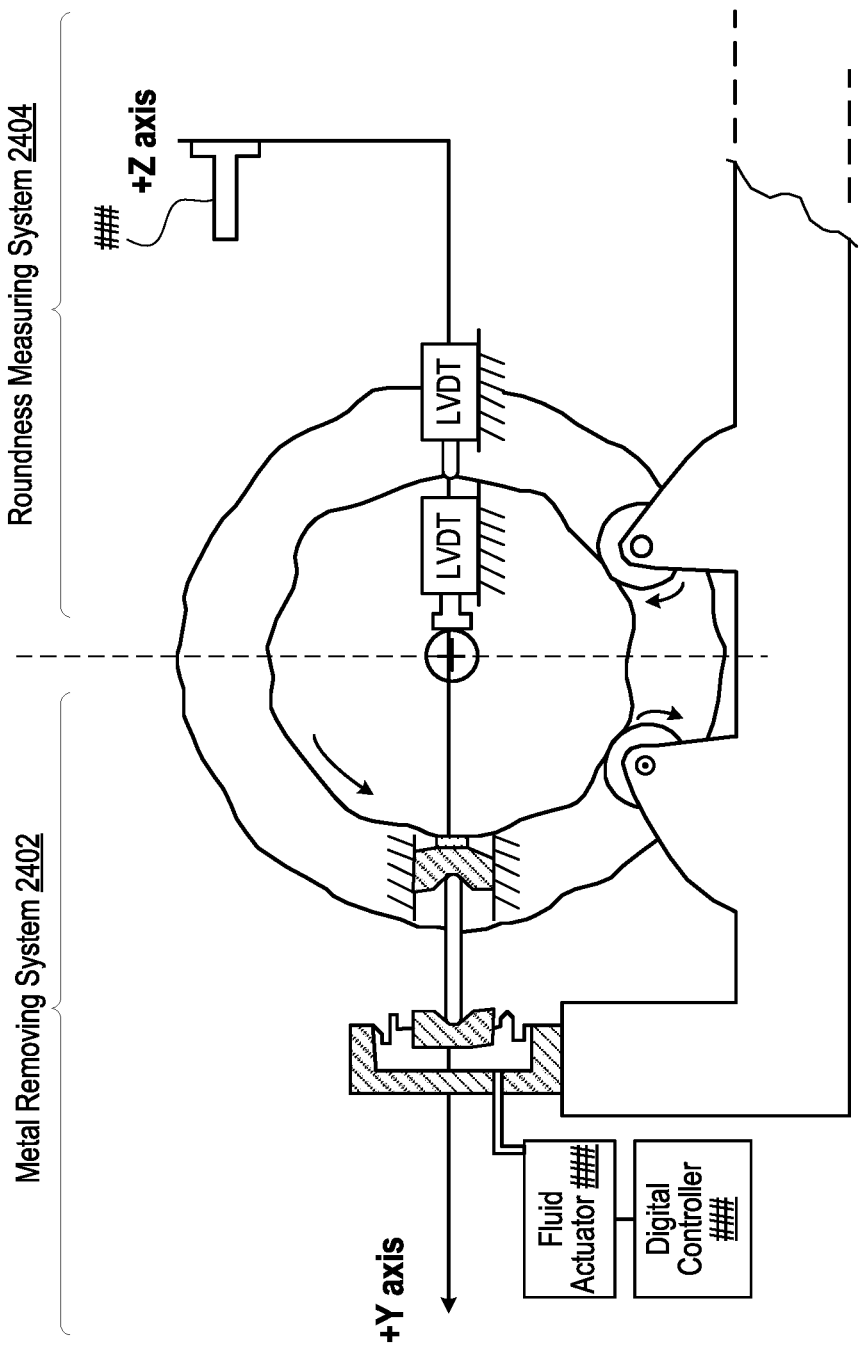
FIG. 24 depicts a metal removing system at the 9 o'clock position for abrading high spots to make a rounder roll, according to one or more embodiments.

FIG. 24 depicts a metal removing system 2400 at the 9 o'clock position for abrading high spots to make a rounder roll. The present invention provides for an automatic gaging system for high precision measurement of roundness and concentricity of large steel mill rolls even while the roll's axis moves in precessing and translating motion. Precessing is the comparatively slow rotation of the axis of rotation of a spinning body about a line intersecting the spin axis Background of Precision Roundness Measurement: In measuring roundness correctly, it is necessary to measure the deviation of many perimeter points of a circular object to a single point near the central region of the object. Earlier air bearing turntable systems accomplished this by confining the object to a perfect axis of rotation. That is, the turntable's axis does not precess (angular wobbling motion) or translate (axis moving parallel to itself and moving in a small non round path).

Thus, the measurements of the radial distances are made to one common reference point in the central part of an unknown round object. These measurements are always relative radio measurements and are not absolute radius values. The precision turntable can only support weights based on its effective bearing area and the modest working pressure of the air bearing design.

The present innovation provides for precision roundness measuring of extremely large components. For objects of revolution that are much larger and heavier than can be supported on a precision air bearing turntable, it is no longer practical to confine large and heavy objects of revolution to a perfect axis of rotation. The solution to this problem is to allow the large object's axis to precess (or wobble) and translate and then measure this motion precisely to eventually determine the true absolute radii of an object of revolution. This is shown in FIGS. 13 and 14.

To accomplish the measurement of Axis precession and translation, a reference line (GRL) is established on the object by mounting a near perfect sphere, such as a grade five (5) ball bearing, on each end of the roll. See FIGS. 11 and 12. The GRL line passes through the centers of both spheres at points L and R in FIG. 13.

Measurements of the sphere's displacement in a horizontal plane for radial and axial movement are detected by high-resolution displacement transducers, either by physical contact with linear variable differential transformer devices or by laser interferometric fringe counting transducers.

At the same time, high resolution transducers are utilized for sensing the OD surface topography of the two necks and the body of the roll (see FIG. 17). A rotary encoder for measuring angular position (an absolute encoder able to measure ½ degree intervals) will aid in collecting data and establishing data fields of absolute radius values versus angular location.

The roll to be measured rests in a rolling v-block on its neck surfaces and the v-block rolls will rotate the roll about 1-3 RPM (see FIG. 14). In FIGS. 13 and 18 are shown the linear equations for computing the absolute value of a radius by accounting for the GRL lines, precession and translating motion.

This measuring technique was first shown in U.S. Pat. No. 5,117,081 (Bagdal) where relative radial variance was being detected, the disclosure of which is hereby incorporated by reference in its entirety. When measuring relative values of radial variation, only roundness, concentricity and axial straightness can be determined. If it is necessary to also measure size, taper and crown of a roll, it will be necessary than absolute values of the radii of a role being measured.

FIGS. 13 and 14 show the new gaging system measuring a work roll (all cylindrical features). The x-y-z coordinate system and a straight-edge representing the x-axis (or y=0) to coordinate the zeroing of all radial probes so that radial distances to the reference speres and the roll's OD surfaces may be measured in absolute values.

In FIG. 13, all distance measurements ($y_L$, $y_N$, $y_R$, $x_L$, $x_N$, $x_R$, $r_{SPH}$, $L_{AB}$, $L_{total}$ and $R_N$) are absolute values. FIG. 14 is an end view of a roll showing the hardware and operating procedure to determine the absolute distances from the x-axis to the reference speres and roll OD surfaces.

This method for measuring roundness was originally developed for the flat rolling of steel, but it can be quite useful for improving other rotating components such as: (i) Mill rolls for aluminum flat rolling; (ii) Steam turbine electric power generating rotors; (iii) Print image rolls in the printing industry; (iv) Rotogravure rolls; (v) Calendaring rolls in the paper industry; (vi) Large diesel engine crankshafts; (vii) Propeller shafts of oceangoing vessels; and (viii) Jet engine rotors. With regard to jet engine rotors, main shafts alone or fully assembled main shafts are measured in order to verify new rotor roundness and straightness and size. Also, the present innovation can be used for checking used rotors for degradation of roundness and axial straightness, which are all due to residual stress relaxation just like end steel mill rolls.

This roundness measuring system was originally developed to solve roll roundness and concentricity defects, and rolls for flat rolling of drawing quality steel used in making exterior body panels of automobiles where surface finish and shape are important. Work rolls and backup rolls are estimated since no one has produced a proper roundness measuring system for very large objects of revolution in order to have roundness errors in the range of 0.0002 inches, 0.0006 inches for the majority of rolls in inventory.

The gauging device of the present invention is intended to measure roundness of the very largest roles in the steel industry, such as 100-ton backup rolls, to a precision of ±10 millionths of an inch, so that rolls maybe eventually machine to 40 millionths of an inch roundness and concentricity.

FIG. 24 shows a metal removing system 2400 under control of a digital computer that operates the absolute radius measuring device of the present disclosure, which will erode away high spots in such a manner as to achieve perfect roundness at all axial positions that are being measured.

This roundness measuring device could be employed several different ways such as: (i) For flat rolling businesses, wherein periodic testing of the necks of work rolls and backup rolls to determine if the next roundness has degraded to the point of needing refurbishing by outside repair shops; and (ii) Used as an additional stage of geometry improvement of the bodies of work rolls and backup rolls after normal regrinding of work bodies. This gauging system would confirm roundness, concentricity, axial straightness, taper and crown of the body of a roll and if any of these parameters are out of spec then they would be improved by touch up grinding by devices such as in FIG. 24 before being sent back into the rolling mill.

For roll manufacturers and roll repair shops, the present gauging device can be used to confirm incoming roll condition, control of metal removal on necks, and documentation to the rolling firms that neck geometry has been corrected.

Description of metal removing system: In FIG. 24, a metal removal device 2400 is shown similar to, but distinctly different from, a super-finishing device first developed by the Chrysler Corp. in the 1930's. The abrasive media is an abrasive stick ½ inch square by 4 inches long. The media is oscillated rapidly ~¼ inch at 200 cycles per minute in the axial direction while being pressed against the roll neck by an air cylinder whose pressure is controlled by the digital computer used in the roundness gauging process. A light mineral oil is showered on the abrasive stone to carry away the metal abraded from the roll. The computer increase is the air pressure to the cylinder pushing the abrasive stick against the roll. When a larger radius of the neck is in contact with the abrasive stick. This increase pressure increases the metal removal rate so that metal is removed at a rate proportionate to the radius size. The lowest valley is left unground.

This is a controlled force and time-based system for metal removal and the roll becomes more round with time. It is possible to overshoot perfect roundness with this system if left too long and operation. Therefore, you must stop before overshooting occurs and take a new measurement of roundness and establish a new schedule for the next metal removing session. The measure machine cycle may need to be performed two or three times until further reduction of roundness error is unnecessary. The rate of metal removal is purposely made low to have good control of roundness improvement.

In one or more embodiments, a controller of the metal removal device 2400 performs a method that includes supporting and rotating a left neck of a roller with a left pair of powered rollers. The method includes measuring an angle of rotation of the roller during rotation by the left and right pairs of powered rollers. The method includes measuring a left neck radial position of the left neck at a current angle of rotation of the roller. The method includes supporting and rotating a right neck of the roller with a right pair of powered rollers that turn at a same rate as the left pair of powered rollers. The method includes measuring a right neck radial position of the right neck at the current angle of rotation of the roller. The method includes measuring a left end radial position of a left reference sphere positioned at a center of a left end of the roller. The method includes measuring a right end radial position of a right reference sphere positioned at a center of a right end of the roller, the left and right reference spheres defining a gage reference line (GRL) through the roller. The method includes determining a calculated center of rotation of the left and right neck based on the measured left and right neck radial positions. The method includes controlling a left metal removing device to selectively remove material from the left neck to produce a round surface that moves the calculated center of rotation of the left neck closer to the GRL. The method includes controlling a right metal removing device to selectively remove material from the right neck to produce a round surface that moves the calculated center of rotation of the right neck closer to the GRL. In one or more particular embodiments, the method includes subsequent to grinding of the necks to enable rotating the roller about the GRL, removing material from a body portion of the roller between the left and right necks to restore roundness of the body portion.

Figure 25:
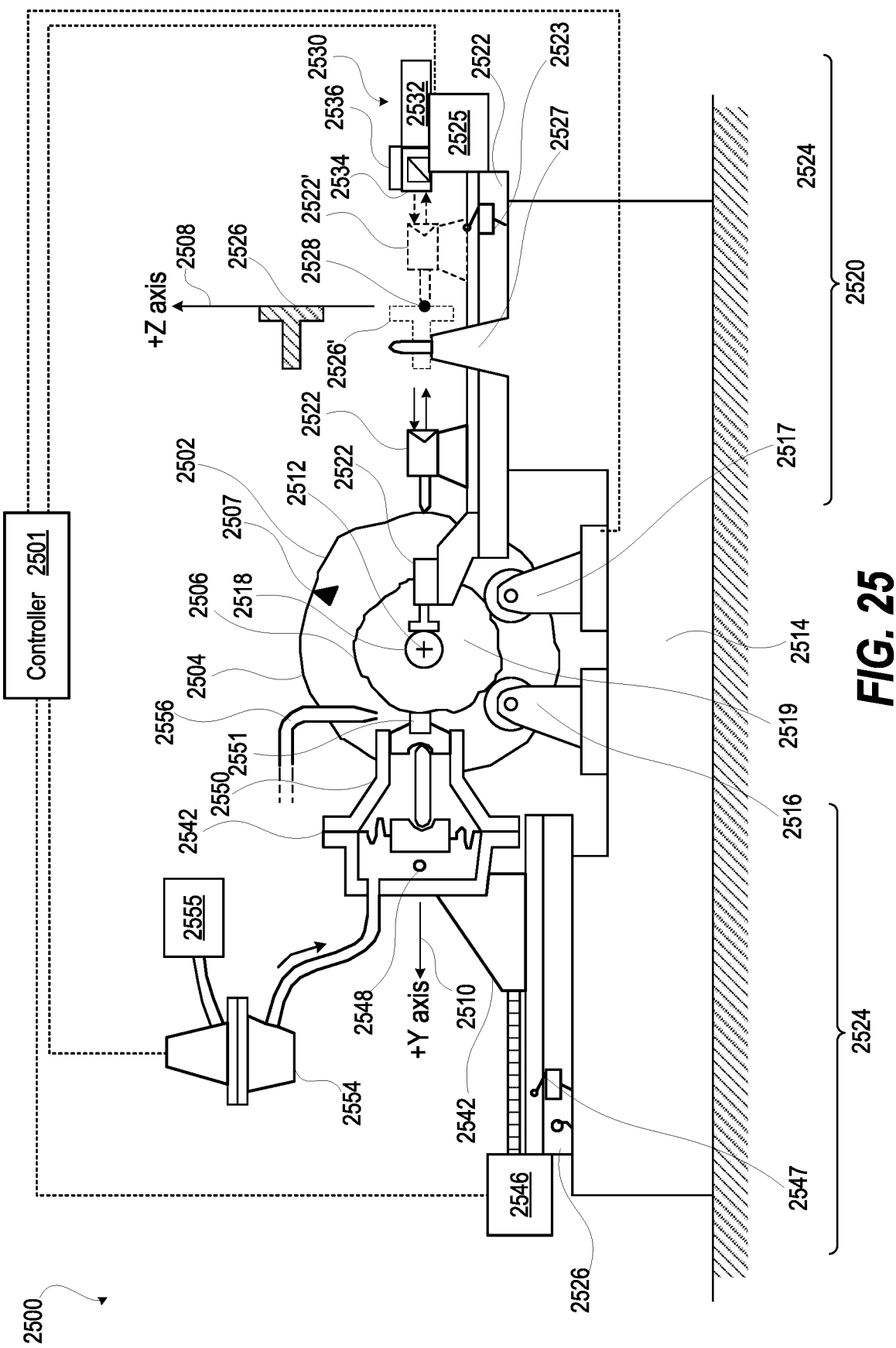
FIG. 25 depicts a front view of a measure-than-machine (MTM) system, managed by a controller, that provides roll roundness, according to one or more embodiments.

FIG. 25 depicts a front view of a measure-than-machine (MTM) system 2500, managed by controller 2501, that provides roll roundness. In an example, MTM system 2500 can be used in steel and aluminum continuous sheet rolling mill rolls. The present disclosure provides novel measuring of the absolute radius of a large object of revolution such as roll 2502. Roll 2502 includes a wider approximately round cylindrical roll body 2504 between roll neck 2506a and roll neck 2506b (FIG. 26) having a smaller diameter. Roll 2502 includes radial index mark 2507 that defines a zero angular reference of rotation position. As depicted, Z-axis 2508 is vertical (upward) and Y-axis 2510 is horizontal (leftward). A longitudinal axis MTM system 2500 of roller 2502 is approximately aligned with X-axis 2512 that is normal to the Y-Z plane depicted in FIG. 25. Machine frame 2514 has left and right powered support rolls 2516-2517 support one neck 2506a of roll 2502. Another pair of support rolls support an opposite roll neck of roll 2502 (not shown). Reference sphere 2518a is attached to end face 2519a of one roll neck 2506a and is aligned with X-axis 2512. Another reference sphere 2518b is attached to opposite end face 2519b of opposite roll neck 2506b (FIG. 26) and is also aligned with X-axis 2512.

Figure 26:
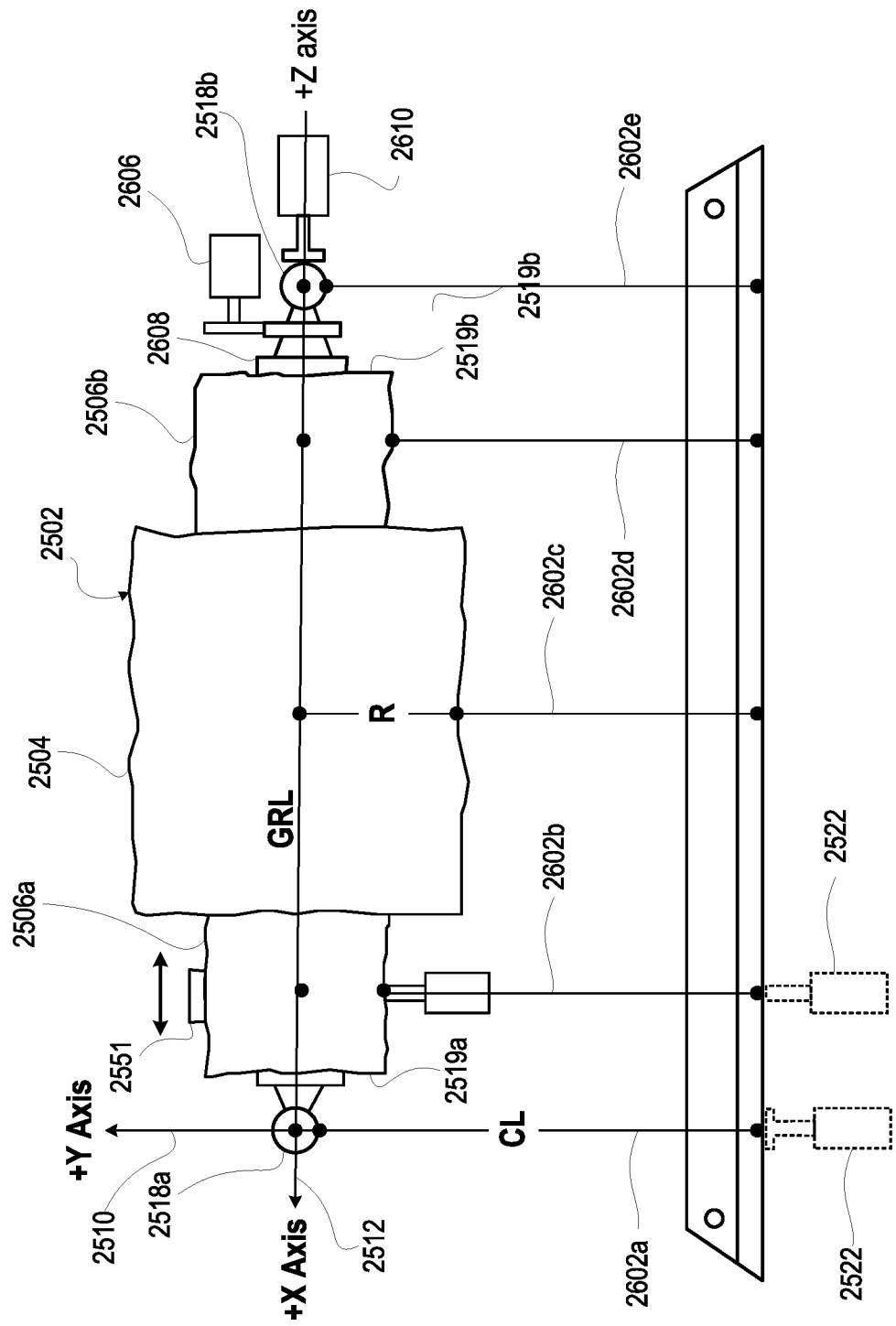
FIG. 26 is a top view of a portion of MTM system of FIG. 25, according to one or more embodiments.

MTM system includes roll measurement subsystem 2520 having radial linear variable displacement transducers (LVDT) probes 2522 received for individual horizontal sliding movement by measurement linear slide 2524 to one side of roll 2502, depicted as to the right. Respective retract limit switches 2523 are positioned in the measurement linear slide 2524 to detect the radial LVDT probes 2522 in their respective retracted positions. Respective electrical motors 2525 move each radial LVDT probe 2522. Straight-edge 2526 is aligned with and movable along Z axis 2510. Straight-edge 2526 is depicted in an up position, allowing radial LVDT probes 2522 to be advanced into contact with respective outer surfaces of roll body 2504, roll necks 2506a-2506b, reference sphere 2518a and reference sphere 2518b (FIG. 26). Radial LVDT probes 2522' (in phantom) are in retracted position. Straight-edge 2526' (in phantom) is depicted in a down positioning fixed against mount 2527 to for establishing a retracted null position (origin 2528) of received radial LVDT probes 2511'. Relative distance between radial LVDT probes 2522 in nulled extended position and radial LVDT probes 2522' in the nulled retracted position is measured by respective laser interferometer systems 2530. Each laser interferometer system 2530 includes laser 2532, optics 2534, and phase detector 2536 capable of measuring to at least a millionth of an inch.

MTM system 2500 includes roll machining subsystem 2540 includes metal removing apparatus 2542 received for horizontal movement by machining linear slide 2544 and moved by electrical motor 2546 to another side, depicted as to the left. Retract limit switch 2547 is positioned in machining linear slide 2544 to detect metal removing apparatus 2542 in a retracted position. Photodiode and LED combination 2548 sense working position of position of short stroke air cylinder 2550 of metal removing apparatus 2542. Short stroke air cylinder 2550 pushes abrasive stick 2551 against roll to provide variable force and thus variable metal removal rates. In one or more embodiments, abrasive stick 2551 has dimensions of ½" sq.×4 inches long in axial direction of roll 2502 for metal removal. Abrasive stick 255a oscillates ¼" in axial direction of roll 2502 at cyclical rate of 200 oscillations per minute.

Air pressure subsystem 2554 meters air pressure from air supply 2525 to short stroke air cylinder 2550 for a variable amount of force as directed by controller 2501. Mineral oil pipe 2556 lubricate abrasive metal removal and washing away of swarf (fine chips and filings).

In an initial phase, metal removing apparatus 2542 can make corresponding roll neck 2506 round prior to machining roll body 2504 for roundness. In particular, the measuring technique obtains a precise measurement of a line segment that is not even a physical part of an object being measured.

FIG. 26 is a top view of a portion of MTM system 2500 with machine frame 2514, roll machining subsystem 2540 and some portions of roll measuring subsystem 2520 (FIG. 25) omitted for clarity. Line segments 2602a-2602e are respectively a distance from straight-edge 2526 that resides in the X-Z plane to a respective feature on the outer surface of the roll 2502 (e.g., first reference sphere 2518a, first roll neck 2506a, roll body 2504, second roll neck2506b, and second reference sphere 2518b). straight-edge 2526 is aligned with X-axis 2512. GRL 2604 passes through a center of first and second reference spheres 2518a-2518b and is not necessarily a centroid or other physical center point of rotation of any of roll body 2504 or first and second roll necks 2506a-2506b. Rotary encoder 2606 is rotated by geared attachment structure 2608 of second reference sphere 2518b. Axial LVDT probe 2610 is longitudinally aligned and in contact with second reference sphere 2518b to sense axial (longitudinal) position of roll 2502 during roll rotation. Control of powered support rolls 2516-2517 (FIG. 25) against conical neck surface of back-up rolls can be used to mitigate axial drift.

Figure 27:
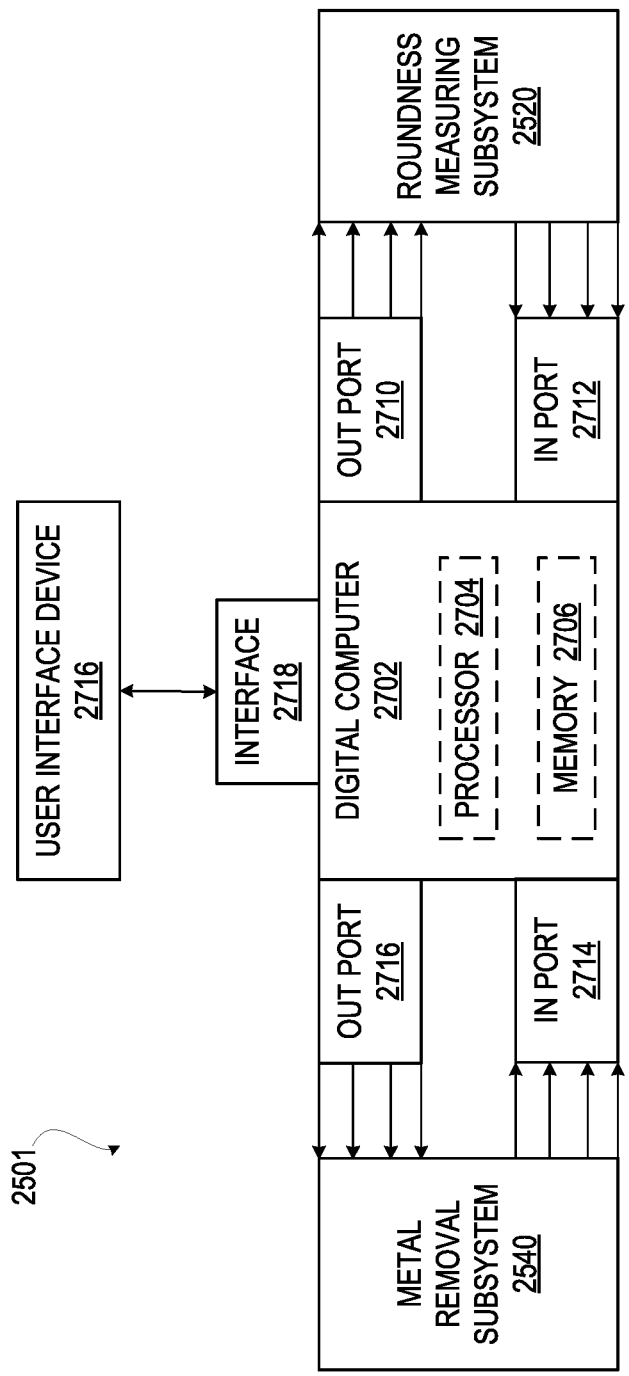
FIG. 27 is a functional block diagram of the controller that controls the MTM system of FIG. 25, according to one or more embodiments.

FIG. 27 is a functional block diagram of controller 2501 that controls MTM system 2500 (FIG. 25). In one or more embodiments, controller 2501 includes digital computer 2702 having a physical processor 2704 utilizes physical memory 2706. Input port 2708 and output port 2710 are communicatively coupled to roll measuring subsystem 2520. Input port 2708 receives distance measurements from laser interferometer systems 25 and rotation position signals from rotary encoder 26. Output port 2610 communicates: (i) power and direction control of electrical motor 2525 to advance and retract radial LVDT probes 2522 (FIG. 25); (ii) power and direction control of electric motor to lift and lower straight edge 2626 (FIG. 25); (iii) output to laser interferometer system 2530; (iv) control lines to zero out; (v) control lines to latch current displacement valve; and (vi) control lines to start and stop roll rotation by powered support rolls 2516-2517 (FIG. 25). Input port 2712 and output port 2714 are communicatively coupled to roll machining subsystem 2540. Input port 2712 receives: (i) retract limit status for retracted metal removing system; and (ii) photodiode-LED beam braking system status. Output port 2714 puts piston of air cylinder in correct operating position. Output port 2714 provides supply power and direction to electrical motor 2546 to advance-retract metal removing devices, turns on air supply to computer controlled air regulate and supply proper level of current to obtain proper pressure on abrasive stick to metal removal rate proportionate to the radius of roll in contact with the abrasive stick. Output port 2714 turns on and off mineral oil pump. Output port 2714 turns on and off abrasive stick axial oscillation motor. Output port 2714 turns on and off motor for roll rotation. Physical processor 2704 is communicatively coupled to user interface device 2716 via interface 2718 to receive user inputs (e.g., ON/OFF, input digital code of angular position of roll for measuring system the metal removal system) and to present outputs (e.g., roundness measurements).

In particular controller supports a method for measuring-than-machining of a backup or support roll:

1. Start. turn power on: Receives operator data input, roll number, roll diameter, size and length axial positions of radial LVDT probes, index mark position on roll, etc. Receives indication that start button has been hit to begin measuring.

2. Controller activates all electrical motors to advance radial LVDT probes toward straight-edge.

3. Controller stops each motor when radial LVDT probe reaches its null position.

4. Controller polls all laser interferometers for their position and stores position in memory.

5. Controller activates electrical motor to retract all radial LVDT probes out of contact with the straight-edge.

6. Controller raises straight edge and activates electrical motors at each end of straight-edge to move straight-edge to the up position.

7. Controller monitors up limit switch for indication to stop straight-edge lifting process.

8. All electrical motors on every radial LVDT probe slide are activated by controller to advance toward the roll and its two reference spheres.

9. Each radial LVDT probes advancement motion stops when the controller senses the radial LVDT probes reaching their null position while roll is not rotating.

10. Controller polls each laser interferometer for how far each radial LVDT probe moved from when it was "nulled out" on the straight-edge to when it was "nulled out" on the roll surface and the two reference spheres respectively. The controller stores this motion as the absolute value of distance from the X-Z plane to the respective object being measured.

11. Controller activates roll rotation at a slow speed of 1 rpm.

10. Controller takes in data of angular position of roll from the rotary encoder and position data from all radial LVDT probes and the one axial LVDT probe.

10. Controller might stop data input after one revolution of roll or might go 2 or 3 revolutions to refine data by statistical procedure.

11. Controller activates electrical motor to retract all radial LVDT probes until senses limit switch activation.

12. Controller calculates the absolute radius of all angular and axial positions. Roundness and concentricity output data is available for output.

13. In response to determining that the operator does not want to proceed to the machining process, the controller prints out final report of roundness and concentricity. Then the method stops.

14. In response to determining that the operator does not want to proceed to the machining process, controller turns on electrical motor to advance all metal removing devices toward the roll surface.

15. Controller stops each slide advancement when a laser beam is blacked out by a piston of a short stroke air cylinder being pushed into its housing the abrasive stick running into the roll.

16. Controller turns on mineral oil pump to aid metal cutting and wash away swarf.

17. Controller starts roll rotation at speed selected by operator (e.g., 2-5 rpm).

18. Controller turns on motor to rapidly oscillate abrasive stick.

19. Controller begins sending signals to all digitally-controlled pressure regulators to vary the metal removal rate proportionately to the magnitude of the radius being encountered.

20. Controller machines the roll for a specified time.

21. Controller stops machining: (a) all digital-control air regulators set to zero output; (b) axial oscillation of abrasive sticks is stopped; and (c) mineral oil pump is stopped.

22. Controller turns on electrical motors on all slides to cause retracting of machining devices from the roll.

23. While rotating, manual or automated cleaning metal removes swarf from apparatus in preparation for another roundness measuring phase.

24. Method ends. The preceding operations may be repeated for next roll.

The MTM system is prepared before the next measuring-than-machining sequence for the next roll. Reference spheres for both ends of roll are already bolted onto roll and adjusted manually for minimized run-out. All radial LVDT probes in fully retracted position. Straight-edge is in down position. All metal removing units are full retracted to as to aid roll loading and unloading. Roll is lowered by crane onto the four powered support rolls where each roll neck rests on two of the support rolls. Roll rotates at 1 to 5 rpm. Rotary encoder is installed on the one spherical reference unit has gear teeth for turning the input shaft of the rotary encoder. Axial location of the roll is maintained while the roll is being rotated by using the four powered support rolls acting as a "rolling v-block" support to steer the roll into axial position. Axial motion is sensed by an LVDT probe aimed in an axial direction and in contact with one of the reference spheres. With roll located and resting on the four support rolls and not rotating, the measure-then-machine operation begins.

1. Electric power is on in response to a manual data input by machine operator.

2. In response to controller being told to start measuring process, all radial LVDT probes move toward straight-edge. Motion toward straight-edge stops when radial LVDT probes reside in their respective null position. Controller stores position data from each laser interferometer on each radial LVDT probe.

3. Later, when radial LVDT probes are in contact with roll surfaces and the two reference spheres and radial LVDT probes are in their null position, another reading of position data from the laser interferometer is stored in computer memory. The controller subtracts the two null positions for each radial LVDT probe to yield the absolute distance from the straight-edge to a resolution of about ±2 millionths of an inch.

4. All radial LVDT probes move in a retracting direction until no radial LVDT probe is in contact with the straight-edge.

5. Controller activates electric motor to raise straight-edge to its "up" position. Movement stops when the UP limit switch is activated.

6. Each radial LVDT probe is mounted on a linear slide and all radial LVDT probes begins moving toward the roll. This horizontal motion is measured very precisely by a laser interferometer on every radial LVDT probe.

7. Each radial LVDT probe stops moving when the radial LVDT probe is depressed to its null position When contacting a corresponding one of reference spheres, roll body and roll neck.

8. Controller records the output location of each laser interferometer for all the radial LVDT probes. At this point the controller has sufficient data to determine the absolute distance from the straight-edge to the surface of the roll and the reference spheres.

9. The roll starts rotation at a low speed (e.g., 1 rpm).

10. Controller takes in raw data during at least one revolution of the roll. Controller stores angular position of the roll by polling the rotary encoder and the displacement data from each radial LVDT probe. This raw data will later be altered by a simple linear equation to yield the absolute radius value at each position that a radial probe exists even though the axis of the roll is precessing during the measurement.

11. All radial probes are retracted from the roll. Motion stops when retract limit switch is activated.

End of roundness measuring process.

12. Controller now has sufficient data from the roundness measuring process that it knows the absolute radius for any position both circumferentially and axially.

13. Beginning of metal removing process.

14. Controller turns on motor of slides to advance the metal removal equipment (e.g., a computer-controlled super-finishing system) to come into contact with the surface of the roll.

15. Advancement ceases when a laser beam is interrupted by the piston movement in the short stroke air cylinder that presses the grinding stick (e.g., a ½"×½"×4" long abrasive media) against the roll.

16. Controller turns on pump to supply mineral oil to abrasive stick to aid metal cutting action and to remove swarf.

17. Controller starts roll rotation at a speed higher than when measuring the roll. Speed may be 2-5 RPM.

18. Controller turns on motor for rapid oscillation of the abrasive stick. An eccentric on the motor oscillates the stick about ¼" in the axial direction about 200-400 cycles per minute.

19. Controller begins sending control signals to an air regulator that pressurizes a short stroke air cylinder that presses the abrasive against the roll. The air pressure selected by the controller is based on the absolute radial length currently in contact with a particular abrasive stick. The controller polls the rotary encoder for the angular position of the roll and looks up the current radial length for each abrasive stick position along the axis of the roll and sends out a signal to each air regulator giving a signal that presses the abrasive stick with a proportionate force to the height of the surface (or value of the absolute radius) so that the metal removal rate depends on the magnitude of the radius involved. The highest radius anywhere on the roll be subjected to the greatest air pressure and the smallest radius anywhere on the roll receives no force at all. With enough time all radii on the roll will be reduced to the smallest radius and will reach this condition at the same time. At this point in time, every station point along the axis where a measuring probe was located (and a mating metal removing system for each radial LVDT probe) will become perfectly round and all their centers will lie on a straight line (meaning perfect concentricity or axial straightness). In the early use of this machine, it is best that a schedule of air pressure should on the low side and machine time be short as it is possible to overshoot the perfect roundness condition and cause radius size reversal (former high spots are not low spots and former low spots are now high spots). It may require several machine-measure cycles to achieve perfect roundness in the early learning stage of this device. Since this device is permanently recording its performance, a statistical quality control study could quickly find the optimum air pressure and time spent machining to minimize the time to achieve perfect roundness in just one measure-then-machine cycle.

20. Controller operates the machining or metal removal process for a specified period of time.

21. Machine process stops after a specified period of time. Controller reduces air pressure in all regulators to zero. Axial motion of abrasive stick ceases when controller turns off motors. Mineral oil pump is stopped.

22. Controller turns on motor on slides to retract all machining devices from the roll.

Metal removal process stops.

23. Clean off metal removal swarf either manually or by an automatic cleaning system under controller control.

24. Controller starts measuring cycle as described as described above and displays a full report of roundness and concentricity condition on its electronic monitor.

25. If roundness and concentricity errors are small enough a final output of the condition of the roll would be printed out or stored in long-term electronic memory banks. Roll is ready for use.

If roundness and concentricity errors are not small enough then begin machining process. Controller has already set up a new air regulator air signal program based on the last roundness measuring session.

It must be noted that, as used in this specification and the appended claims, the singular forms "a," "an" and "the" include plural referents unless the content clearly dictates otherwise. Thus, for example, reference to a "colorant agent" includes two or more such agents.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

As will be appreciated by one having ordinary skill in the art, the methods and compositions of the invention substantially reduce or eliminate the disadvantages and drawbacks associated with prior art methods and compositions.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. A measure-then-machine (MTM) system comprising:
a machine frame having: (i) a first pair of powered support rolls that receives a first roll neck; and (ii) a second pair of powered support rolls that receives a second roll neck of a roll used as one of a backup roll and a work roll for sheet metal forming, a longitudinal axis of the roll aligned with a longitudinal X-axis of the machine frame, wherein a first longitudinal end of the roll is supported by the first roll neck, and a second longitudinal end of the roll is supported by the second roll neck;
a roll measuring subsystem configured to measure wobbling of the roll, comprising:
a measurement linear slide on a first side of the roll;
at least two radial probes received for respective radial movement in parallel to a Y-axis of the machine frame that is orthogonal to the X-axis;
one or more laser interferometer systems aligned to measure distance along the Y-axis for a corresponding one of the at least two radial probes that are positioned to extend respectively to at least one of: (i) a first reference sphere coupled to and centered on the first longitudinal end of the roll on a gauge reference line (GRL); (ii) the first roll neck; (iii) the roll body; (iv) the second roll neck; and a second reference sphere coupled to and centered on the second longitudinal end of the roll on the GRL;
one or more first electrical motors coupled to move along the Y-axis respectively a corresponding one of the at least two radial probes;
a straight-edge that is positioned at an origin line that is parallel to the X-axis, which defines a y=0 position, to zero out all radial probes in order to begin the measurement of absolute Y values, and is in front of the at least two radial probes in a retracted position to obtain a null measurement; wherein the roll measuring subsystem is configured to determine an X-Y position of a roll axis by measuring absolute distances relative to the origin line, wherein:
the at least two radial probes are configured to be displaced along the Y-axis until contacting the roll body to measure an absolute distance between the origin line and the roll body,
the at least two radial probes are configured to be displaced along the Y-axis until contacting the first reference sphere and second reference sphere to measure an absolute distance between the origin line and the first reference sphere and an absolute distance between the origin line and the second reference sphere, thereby defining a location of the GRL,
wherein the roll measuring subsystem is configured to determine the X-Y position of the roll axis based on the measured absolute distance between the origin line and the roll body and the absolute distances between the origin line and the first and second reference spheres,
wherein the roll measuring subsystem is configured to compute an absolute radius of the roll based on the location of the GRL and the measured absolute distance between the origin line and the roll body; and
a rotary encoder that senses a rotation position of the roll, wherein the rotary encoder is an absolute rotary encoder, wherein the absolute rotary encoder is configured to measure angular position at 1/2 degree intervals that aid in collecting data and establishing data fields of absolute radius values versus angular location;
a roll machining subsystem comprising:
a machining linear slide on a second side of the roll, the second side being opposite to the first side;
a metal removing device received for horizontal movement by the machining linear slide, wherein the metal removing device comprises an oscillating abrasive media; and
a second electrical motor coupled to move the metal removing device on the machining linear slide; and
a controller communicatively coupled to the powered support rolls, the roll measuring subsystem and the roll machining subsystem, and which:
nulls the at least two radial probes against the straightedge that is positioned at the origin line;
measures a respective origin distance for each of the at least two radial probes using a corresponding laser interferometer system of the one or more laser interferometer systems;
monitors the rotary encoder for the rotation position of the roll;
moves the at least two radial probes into contact with the roll body using a corresponding one of the first electrical motors in order to measure the absolute distance between the origin line and the roll body;
rotates the roll using the powered support rolls;
measures a respective radial distance from the GRL at a particular rotation angle of the roll for each one of the at least two radial probes using the corresponding laser interferometer system;
determines an amount of machining required for each portion of the roll based on the respective radial distance from the GRL;
machines the roll using the metal removing device by removing metal at rate related to the respective radial distance from the GRL for each portion of the roll;
a machine oil dispensing system positioned to lubricate a contact point between the metal removing device and the roll;
wherein the MTM system is configured to allow for precession and translation of an object's GRL and to measure the precession and translation motion to determine and calculate the absolute radius of the roll.

2. The MTM system of claim 1, wherein the metal removing device comprises an air-pressure driven oscillating abrasive stick.

3. The MTM system of claim 1, further comprising:
an air blowing system positioned to remove swarf removed by the metal removing device.

4. A method comprising:
determining a rotation position of a roll received on a machine of a measure-then-machine (MTM) system comprising a machine frame having: (a) a first pair of powered support rolls that receives a first roll neck; (b) a second pair of powered support rolls that receives a second roll neck of a roll used as one of a backup roll and a work roll for sheet metal forming, a longitudinal axis of the roll aligned with a longitudinal X-axis of the machine frame, wherein a first longitudinal end of the roll is supported by the first roll neck, and a second longitudinal end of the roll is supported by the second roll neck; and (c) one or more laser interferometer systems aligned to measure distance along a Y-axis of the machine frame for a corresponding one of at least two radial probes that are positioned to extend respectively to at least one of: (i) a first reference sphere coupled to and centered on the first longitudinal end of the roll on a gauge reference line (GRL); (ii) the first roll neck; (iii) the roll body; (iv) the second roll neck; and a second reference sphere coupled to and centered on the second longitudinal end of the roll on the GRL, configured to measure wobbling of the roll;
nulling the at least two radial probes against a straightedge that is positioned at an origin line that is parallel to the X-axis and defines a y=0 position, the at least two radial probes received for respective radial movement in parallel to the Y-axis of the machine frame that is orthogonal to the X-axis to zero out all radial probes in order to begin the measurement of absolute Y values;
wherein the system is configured to determine an X-Y position of the roll axis by measuring absolute distances relative to the origin line, the method further comprising:
displacing the at least two radial probes along the Y-axis until contacting the roll body to measure an absolute distance between the origin line and the roll body,
displacing the at least two radial probes along the Y-axis until contacting the first reference sphere and second reference sphere to measure an absolute distance between the origin line and the first reference sphere and an absolute distance between the origin line and the second reference sphere, thereby defining a location of the GRL,
determining the X-Y position of the roll based on the measured absolute distance between the origin line and the roll body and the absolute distances between the origin line and the first and second reference spheres,
computing an absolute radius of the roll based on the location of the GRL and the measured absolute distance between the origin line and the roll body; and
measuring a respective origin distance for each of the at least two radial probes using a corresponding laser interferometer system of the one or more laser interferometer systems;
monitoring a rotary encoder for the rotation position of the roll, wherein the rotary encoder is an absolute rotary encoder, wherein the absolute rotary encoder is configured to measure angular position at 1/2 degree intervals that aid in collecting data and establishing data fields of absolute radius values versus angular location;

moving the at least two radial probes into contact with the roll body using a corresponding electrical motor in order to measure the absolute distance between the origin line and the roll body;

rotating the roll using the powered support rolls;

measuring a respective radial distance from the GRL at a particular rotation angle of the roll for each one of the at least two radial probes using the corresponding laser interferometer system;

determining an amount of machining required for each portion of the roll based on the respective radial distance from the GRL; and machining the roll using a metal removing device by removing metal at rate related to the respective radial distance from the GRL for each portion of the roll, wherein the metal removing device comprises an oscillating abrasive media, and wherein the MTM system is configured to allow for precession and translation of an object's GRL and to measure the precession and translation motion to determine and calculate the absolute radius of the roll, and wherein the MTM system further comprises:

a machine oil dispensing system positioned to lubricate a contact point between the metal removing device and the roll.

5. A computer program product comprising:

a non-transitory computer readable storage device; and program code on the non-transitory computer readable storage device that when executed by a processor associated with an electronic device, the program code enables the electronic device to provide functionality of:

determining a rotation position of a roll received on a machine of a measure-then- machine (MTM) system comprising a machine frame having: (a) a first pair of powered support rolls that receives a first roll neck; (b) a second pair of powered support rolls that receives a second roll neck of a roll used as one of a backup roll and a work roll for sheet metal forming, a longitudinal axis of the roll aligned with a longitudinal X-axis of the machine frame, wherein a first longitudinal end of the roll is supported by the first roll neck, and a second longitudinal end of the roll is supported by the second roll neck; and (c) one or more laser interferometer systems aligned to measure distance along a Y-axis of the machine frame for a corresponding one of at least two radial probes that are positioned to extend respectively to at least one of: (i) a first reference sphere coupled to and centered on the first longitudinal end of the roll on a gauge reference line (GRL); (ii) the first roll neck; (iii) the roll body; (iv) the second roll neck; and a second reference sphere coupled to and centered on the second longitudinal end of the roll on the GRL, configured to measure wobbling of the roll;

nulling the at least two radial probes against a straight-edge that is positioned at an origin line that is parallel to the X-axis and defines a y=0 position, the at least two radial probes received for respective radial movement in parallel to the Y-axis of the machine frame that is orthogonal to the X-axis to zero out all radial probes in order to begin the measurement of absolute Y values; wherein the system is configured to determine an X-Y position of the roll axis by measuring absolute distances relative to the origin line, displacing the at least two radial probes along the Y-axis until contacting the roll body to measure an absolute distance between the origin line and the roll body, displacing the at least two radial probes along the Y-axis until contacting the first reference sphere and second reference sphere to measure an absolute distance between the origin line and the first reference sphere and an absolute distance between the origin line and the second reference sphere, thereby defining a location of the GRL, determining the X-Y position of the roll based on the measured absolute distance between the origin line and the roll body and the absolute distances between the origin line and the first and second reference spheres, computing an absolute radius of the roll based on the location of the GRL and the measured absolute distance between the origin line and the roll body; and measuring a respective origin distance for each of the at least two radial probes using a corresponding laser interferometer system of the one or more laser interferometer systems;

monitoring a rotary encoder for the rotation position of the roll, wherein the rotary encoder is an absolute rotary encoder, wherein the absolute rotary encoder is configured to measure angular position at 1/2 degree intervals that aid in collecting data and establishing data fields of absolute radius values versus angular location;

moving the at least two radial probes into contact with the roll body using a corresponding electrical motor in order to measure the absolute distance between the origin line and the roll body;

rotating the roll using the powered support rolls;

measuring a respective radial distance from the GRL at a particular rotation angle of the roll for each one of the at least two radial probes using the corresponding laser interferometer system;

determining an amount of machining required for each portion of the roll based on the respective radial distance from the GRL; and machining the roll using a metal removing device by removing metal at rate related to the respective radial distance from the GRL for each portion of the roll, wherein the metal removing device comprises an oscillating abrasive media, and wherein the MTM system is configured to allow for precession and translation of an object's GRL and to measure the precession and translation motion to determine and calculate the absolute radius of the roll, and wherein the MTM system further comprises:

a machine oil dispensing system positioned to lubricate a contact point between the metal removing device and the roll.

* * * * *